US012605633B2

(12) United States Patent
Yonemoto

(10) Patent No.: US 12,605,633 B2
(45) Date of Patent: Apr. 21, 2026

(54) GAME EVALUATION METHOD, DEVICE, AND APPLICATION EVALUATION METHOD

(71) Applicant: Precious Analytics Inc., Tokyo (JP)

(72) Inventor: Hiroki Yonemoto, Tokyo (JP)

(73) Assignee: Precious Analytics Inc., Tokyo (JP)

( * ) Notice: Subject to any disclaimer, the term of this patent is extended or adjusted under 35 U.S.C. 154(b) by 250 days.

(21) Appl. No.: 18/014,487

(22) PCT Filed: Jul. 5, 2021

(86) PCT No.: PCT/JP2021/025304
§ 371 (c)(1),
(2) Date: Jan. 5, 2023

(87) PCT Pub. No.: WO2022/009836
PCT Pub. Date: Jan. 13, 2022

(65) Prior Publication Data
US 2023/0219002 A1     Jul. 13, 2023

(30) Foreign Application Priority Data

Jul. 6, 2020     (JP) ................................. 2020-116529

(51) Int. Cl.
*A63F 13/58*          (2014.01)
(52) U.S. Cl.
CPC .................................... *A63F 13/58* (2014.09)
(58) Field of Classification Search
CPC ..................................................... A63F 13/58
See application file for complete search history.

(56) References Cited

U.S. PATENT DOCUMENTS

2005/0096131 A1 *    5/2005   Ouchi ..................... A63F 13/56
463/31

FOREIGN PATENT DOCUMENTS

| CN | 108038135 | 5/2018 |
| CN | 109794060 | 5/2019 |
| JP | 2019-000457 | 1/2019 |
| JP | 2020-028709 | 2/2020 |

OTHER PUBLICATIONS

Supplementary European Search Report and the European Search Opinion Dated Jun. 18, 2024 From the European Patent Office Re. Application No. 21836929.6. (12 Pages).
Silva et al. "Dynamic Difficulty Adjustment on MOBA Games", Entertainment Computing, XP029823731, 18: 103-123, Available Online Oct. 4, 2016.

(Continued)

*Primary Examiner* — Yingchuan Zhang

(57) ABSTRACT

The present disclosure relates to a game evaluation method, evaluation device, and evaluation program. With the game evaluation method according to the present disclosure, a computer is caused to execute: (A) a step of calculating, when a player takes action, the multiplication of an expected value for acquiring and consuming each item by the presumed number of times of the action taken by the player, on the basis of parameters in a master; and (B) a step of visualizing the balance of each item on the basis of the result of the multiplication.

8 Claims, 22 Drawing Sheets

(56)     References Cited

OTHER PUBLICATIONS

Silva et al. "Dynamic Difficulty Adjustment Through an Adaptive AI", 2015 14th Brazilian Symposium on Computer Games and Digital Entertainment, SBGames, XP033027488, Piaui, Brazil, Nov. 11-13, 2015, p. 173-182, Nov. 11, 2015.

Suaza et al. "A Health Point-Based Dynamic Difficulty Adjustment Strategy for Video Games", Entertainment Computing and Serious Games, XP047674533, Proceeding of the First IFIP TC 14 Joint International Conference, ICEC-JCSG 2019, Arequipa, Peru, Nov. 11-15, 2019, p. 436-440, Nov. 11, 2019.

Gamebiz "Importance of Preliminary Design and Visualization, Interview With Mr. Yonemoto, PreciousAnalytics About the Steps of Level Design", Gamebiz, Jun. 5, 2017.

Social Wire "AI-Based Automatic Adjustment of Game Balance Evaluation Service for App Game Companies . . . It Evaluates Whether the Game Has a Design Balance That Sells Before the Game Is Released", Precious Analytics Corporation, Officially launched on Monday, May 18, 2018, Social Wire, May 21, 2021.

Invitation to Respond to Written Opinion Dated Aug. 20, 2025 From the Intellectual Property Office of Singapore, IPOS Re. Application No. 11202300021X. (9 Pages).

Gamebiz "[Interview] 'Parameter Design Based on UX Policy' . . . Asking Mr. Yonemoto, Precious Analytics, About What Is Level Design for Long-Term Operation and Maintaining Sales", Gamebiz, 9 P., Feb. 10, 2017. & English Translation.

Kadokawa "Featured Game Balance Adjustments", God Eater 2, Weekly Famitsu 1307, 29(1): 172-173, Dec. 19, 2013. & English Translation.

* cited by examiner

UX CONFIRMATION — 106

KPI DESIGN — 105

UX VISUALIZATION — 104

PARAMETER SETTING — 103

GAME LOGIC DESIGN — 102

UX POLICY DETERMINATION — 101

410

| QUEST ID | ITEM ID | AMOUNT |
|---|---|---|
| 1 | 1 | 1 |
| 1 | 3 | 1 |
| 1 | 4 | 1 |
| 1 | 6 | 1 |
| 2 | 1 | 2 |
| 2 | 2 | 2 |
| 2 | 5 | 1 |
| 2 | 6 | 1 |
| 3 | 1 | 3 |
| 3 | 4 | 2 |
| 3 | 5 | 1 |
| 3 | 6 | 2 |

420

| ID | ITEM NAME | QUEST NAME | | |
|---|---|---|---|---|
| | | MEADOW | CAVE | MINE |
| 1 | MEDICINAL PLANT | 1 | 2 | 3 |
| 2 | SMALL RECOVERY MEDICINE | | 2 | |
| 3 | FRAGMENT | 1 | | |
| 4 | IRON ORE | 1 | | 2 |
| 5 | PRECIOUS STONE | | 1 | 1 |
| 6 | CARD | 1 | 1 | 2 |

CONVERT NON-STANDARD MASTER FORMAT INTO
STANDARD MASTER FORMAT

S702

CALCULATE EXPECTED VALUE OF ITEMS ×
ASSUMED NUMBER OF TIMES

S703

VISUALIZE RESULT OF USE OF PARAMETER, BY
SIMULATING ACQUIRED AMOUNT, CONSUMED
AMOUNT, AND BALANCE OF ITEM

S704

ADJUST PARAMETER BASED ON SIMULATION
RESULT gacha_master(901)

| ID | lot_table_id | use_item_id | use_item_amount |
|---|---|---|---|
| 50001 | 501 | 11 | 20 |
| 50002 | 502 | 22 | 20 |

~910 gacha_lot_table_master(902)

| ID | rarity | weight |
|---|---|---|
| 501 | SR | 80 |
| 501 | SSR | 15 |
| 501 | UR | 5 |
| 502 | SR | 80 |
| 502 | SSR | 15 |
| 502 | UR | 5 |

~920 gacha_prize_table_master(903)

| id | chara | weight |
|---|---|---|
| SR | SR_A | 10 |
| SR | SR_B | 10 |
| SR | SR_C | 10 |
| SSR | SSR_A | 10 |
| SSR | SSR_B | 10 |
| SSR | SSR_C | 20 |
| UR | UR_A | 10 |
| UR | UR_B | 10 |

FIG. 9 group_trans_1(1110)

| ROW | group_id | separation_id | select_type | amount | weight |
|---|---|---|---|---|---|
| 1 | 10001 | 1001 | first | 1 | |
| 2 | 10002 | 1001 | first | 1 | |
| 3 | 10003 | 1002 | first | 1 | |
| 4 | 10001 | 201 | loop | 1 | |
| 5 | 10002 | 202 | loop | 1 | |
| 6 | 10003 | 203 | loop | 1 | |
| 7 | 50001 | 501 | loop | 1 | |
| 8 | 50002 | 502 | loop | 10 | |
| 9 | 50001 | 11 | loop | -20 | |
| 10 | 50002 | 11 | loop | -20 | | group_trans_2(1120)    ⌐~1111    ⌐~1112

| ROW | group_id | separation_id | select_type | amount | weight |
|---|---|---|---|---|---|
| 1 | 1001 | 11 | loop | 10 | |
| 2 | 1002 | 11 | loop | 20 | |
| 3 | 201 | 2001 | loop | 1 | |
| 4 | 201 | 2002 | loop | 1 | |
| 5 | 202 | 2001 | loop | 1 | |
| 6 | 202 | 2003 | loop | 1 | |
| 7 | 203 | 2001 | loop | 1 | |
| 8 | 203 | 2004 | loop | 1 | |
| 9 | 501 | SR | random | 1 | 80 |
| 10 | 501 | SSR | random | 1 | 15 |
| 11 | 501 | UR | random | 1 | 5 |
| 12 | 502 | SR | random | 1 | 80 |
| 13 | 502 | SSR | random | 1 | 15 |
| 14 | 502 | UR | random | 1 | 5 | group_trans_3(1130)    ⌐~1113

| ROW | group_id | separation_id | select_type | amount | weight |
|---|---|---|---|---|---|
| 1 | 2001 | 21 | loop | 5 | 10000 |
| 2 | 2002 | 22 | loop | 5 | 10000 |
| 3 | 2003 | 22 | loop | 10 | 10000 |
| 4 | 2004 | 22 | loop | 15 | 10000 |
| 5 | SR | SR_A | random | 1 | 10 |
| 6 | SR | SR_B | random | 1 | 10 |
| 7 | SR | SR_C | random | 1 | 10 |
| 8 | SSR | SSR_A | random | 1 | 10 |
| 9 | SSR | SSR_B | random | 1 | 10 |
| 10 | SSR | SSR_C | random | 1 | 20 |
| 11 | UR | UR_A | random | 1 | 10 |
| 12 | UR | UR_B | random | 1 | 10 |
| 13 | SR | SR_A | random | 1 | 10 |
| 14 | SR | SR_B | random | 1 | 10 |
| 15 | SR | SR_C | random | 1 | 10 |
| 16 | SSR | SSR_A | random | 1 | 10 |
| 17 | SSR | SSR_B | random | 1 | 10 |
| 18 | SSR | SSR_C | random | 1 | 20 |
| 19 | UR | UR_D | random | 1 | 10 |
| 20 | UR | UR_E | random | 1 | 10 |

FIG. 11

| ROW | ACTION NAME | ITEM NAME | AMOUNT | FIRST TIME |
|---|---|---|---|---|
| 1 | 10001 | 11 | 10.0 | TRUE |
| 2 | 10001 | 21 | 5.0 | FALSE |
| 3 | 10001 | 22 | 5.0 | FALSE |
| 4 | 10002 | 11 | 10.0 | TRUE |
| 5 | 10002 | 21 | 5.0 | FALSE |
| 6 | 10002 | 22 | 10.0 | FALSE |
| 7 | 10003 | 11 | 20.0 | TRUE |
| 8 | 10003 | 21 | 5.0 | FALSE |
| 9 | 10003 | 22 | 15.0 | FALSE |
| 10 | 50001 | SR_A | 0.266 | FALSE |
| 11 | 50001 | SR_B | 0.266 | FALSE |
| 12 | 50001 | SR_C | 0.266 | FALSE |
| 13 | 50001 | SSR_A | 0.038 | FALSE |
| 14 | 50001 | SSR_B | 0.038 | FALSE |
| 15 | 50001 | SSR_C | 0.075 | FALSE |
| 16 | 50001 | UR_A | 0.025 | FALSE |
| 17 | 50001 | UR_B | 0.025 | FALSE |
| 18 | 50001 | 11 | -20.000 | FALSE |
| 19 | 50002 | SR_A | 0.266 | FALSE |
| 20 | 50002 | SR_B | 0.266 | FALSE |
| 21 | 50002 | SR_C | 0.266 | FALSE |
| 22 | 50002 | SSR_A | 0.038 | FALSE |
| 23 | 50002 | SSR_B | 0.038 | FALSE |
| 24 | 50002 | SSR_C | 0.075 | FALSE |
| 25 | 50002 | UR_D | 0.025 | FALSE |
| 26 | 50002 | UR_E | 0.025 | FALSE |
| 27 | 50002 | 21 | -20.000 | FALSE |

FIG. 12 battle_master(1310)

| id | first_treasure_id | first_treasure_amount | random_treasure_id | random_treasure_amount |
|---|---|---|---|---|
| 3001 | 111 | 5 | 222 | 50 |
| 3002 | 111 | 10 | 222 | 100 |
| 3003 | 111 | 15 | 222 | 150 |
| 3004 | 111 | 20 | 222 | 200 |
| 3005 | 111 | 25 | 222 | 250 | event_gacha_master(1320)

| id | card | weight |
|---|---|---|
| 100001 | UR_AA | 1 |
| 100001 | UR_BB | 1 |
| 100001 | UR_CC | 1 |
| 100001 | UR_DD | 1 |
| 100001 | SSR_AA | 4 |
| 100001 | SSR_BB | 4 |
| 100001 | SSR_CC | 4 |
| 100001 | SSR_DD | 4 |
| 100001 | SR_AA | 8 |
| 100001 | SR_BB | 8 |
| 100001 | SR_CC | 8 |
| 100001 | SR_DD | 8 |
| 100001 | R_AA | 12 |
| 100001 | R_BB | 12 |
| 100001 | R_CC | 12 |
| 100001 | R_DD | 12 |

FIG. 13 group_trans_1_conf

| input_file | group_id_column | separation_id_column | separation_id_master | select_type_column | amount_column | weight_column |
|---|---|---|---|---|---|---|
| battle_master | id | first_treasure_id | | first | first_treasure_amount | |
| battle_master | id | random_treasure_id | | loop | random_treasure_amount | |
| event_gacha_master | id | card | | random | | weight |

FIG. 14 group_trans_1

| ROW | group_id | separation_id | select_type | amount | weight |
|---|---|---|---|---|---|
| 1 | 3001 | 111 | first | 5 | |
| 2 | 3002 | 111 | first | 10 | |
| 3 | 3003 | 111 | first | 15 | |
| 4 | 3004 | 111 | first | 20 | |
| 5 | 3005 | 111 | first | 25 | |
| 6 | 3001 | 222 | loop | 50 | |
| 7 | 3002 | 222 | loop | 100 | |
| 8 | 3003 | 222 | loop | 150 | |
| 9 | 3004 | 222 | loop | 200 | |
| 10 | 3005 | 222 | loop | 250 | |
| 11 | 100001 | UR_AA | random | 1 | 1 |
| 12 | 100001 | UR_BB | random | 1 | 1 |
| 13 | 100001 | UR_CC | random | 1 | 1 |
| 14 | 100001 | UR_DD | random | 1 | 1 |
| 15 | 100001 | SSR_AA | random | 1 | 4 |
| 16 | 100001 | SSR_BB | random | 1 | 4 |
| 17 | 100001 | SSR_CC | random | 1 | 4 |
| 18 | 100001 | SSR_DD | random | 1 | 4 |
| 19 | 100001 | SR_AA | random | 1 | 8 |
| 20 | 100001 | SR_BB | random | 1 | 8 |
| 21 | 100001 | SR_CC | random | 1 | 8 |
| 22 | 100001 | SR_DD | random | 1 | 8 |
| 23 | 100001 | R_AA | random | 1 | 12 |
| 24 | 100001 | R_BB | random | 1 | 12 |
| 25 | 100001 | R_CC | random | 1 | 12 |
| 26 | 100001 | R_DD | random | 1 | 12 |

FIG. 15

| ROW | ACTION NAME | ITEM NAME | AMOUNT | FIRST TIME |
|---|---|---|---|---|
| 1 | 3001 | 111 | 5.0 | TRUE |
| 2 | 3001 | 222 | 50.0 | FALSE |
| 3 | 3002 | 111 | 10.0 | TRUE |
| 4 | 3002 | 222 | 100.0 | FALSE |
| 5 | 3003 | 111 | 15.0 | TRUE |
| 6 | 3003 | 222 | 150.0 | FALSE |
| 7 | 3004 | 111 | 20.0 | TRUE |
| 8 | 3004 | 222 | 200.0 | FALSE |
| 9 | 3005 | 111 | 25.0 | TRUE |
| 10 | 3005 | 222 | 250.0 | FALSE |
| 11 | 100001 | UR_AA | 0.01 | FALSE |
| 12 | 100001 | UR_BB | 0.01 | FALSE |
| 13 | 100001 | UR_CC | 0.01 | FALSE |
| 14 | 100001 | UR_DD | 0.01 | FALSE |
| 15 | 100001 | SSR_AA | 0.04 | FALSE |
| 16 | 100001 | SSR_BB | 0.04 | FALSE |
| 17 | 100001 | SSR_CC | 0.04 | FALSE |
| 18 | 100001 | SSR_DD | 0.04 | FALSE |
| 19 | 100001 | SR_AA | 0.08 | FALSE |
| 20 | 100001 | SR_BB | 0.08 | FALSE |
| 21 | 100001 | SR_CC | 0.08 | FALSE |
| 22 | 100001 | SR_DD | 0.08 | FALSE |
| 23 | 100001 | R_AA | 0.12 | FALSE |
| 24 | 100001 | R_BB | 0.12 | FALSE |
| 25 | 100001 | R_CC | 0.12 | FALSE |
| 26 | 100001 | R_DD | 0.12 | FALSE |

FIG. 16 story_quest_master(1710)

| id | action_num | | |
| --- | --- | --- | --- |
| | day1 | day2 | day3 |
| 10001 | 5 | 3 | |
| 10002 | | 5 | 3 |
| 10003 | | | 5 | gacha_master(1720)

| id | action_num | | |
| --- | --- | --- | --- |
| | day1 | day2 | day3 |
| 50001 | 2 | 3 | |
| 50002 | | | 2 |

| ROW | ACTION NAME | ITEM NAME | NUMBER OF TIMES OF ACTIONS | | | ACQUIRED AMOUNT | | |
|---|---|---|---|---|---|---|---|---|
| | | | day1 | day2 | day3 | day1 | day2 | day3 |
| 1 | 10001 | 11 | 5 | 5 | 3 | 50 | 30 | 0 |
| 2 | 10001 | 21 | 5 | 5 | 3 | 25 | 15 | 0 |
| 3 | 10001 | 22 | 5 | 5 | 3 | 25 | 15 | 0 |
| 4 | 10002 | 11 | 0 | 0 | 5 | 0 | 50 | 30 |
| 5 | 10002 | 21 | 0 | 0 | 5 | 0 | 25 | 15 |
| 6 | 10002 | 22 | 0 | 0 | 5 | 0 | 50 | 30 |
| 7 | 10003 | 11 | 0 | 0 | 0 | 0 | 0 | 100 |
| 8 | 10003 | 21 | 0 | 0 | 0 | 0 | 0 | 25 |
| 9 | 10003 | 22 | 0 | 0 | 0 | 0 | 0 | 75 |
| 10 | 50001 | SR_A | 2 | 2 | 3 | 0.532 | 0.798 | 0 |
| 11 | 50001 | SR_B | 2 | 2 | 3 | 0.532 | 0.798 | 0 |
| 12 | 50001 | SR_C | 2 | 2 | 3 | 0.532 | 0.798 | 0 |
| 13 | 50001 | SSR_A | 2 | 2 | 3 | 0.076 | 0.114 | 0 |
| 14 | 50001 | SSR_B | 2 | 2 | 3 | 0.076 | 0.114 | 0 |
| 15 | 50001 | SSR_C | 2 | 2 | 3 | 0.15 | 0.225 | 0 |
| 16 | 50001 | UR_A | 2 | 2 | 3 | 0.05 | 0.076 | 0 |
| 17 | 50001 | UR_B | 2 | 2 | 3 | 0.05 | 0.076 | 0 |
| 18 | 50001 | 11 | 2 | 2 | 3 | -40 | -60 | 0 |
| 19 | 50002 | SR_A | 0 | 0 | 2 | 0 | 0 | 0.532 |
| 20 | 50002 | SR_B | 0 | 0 | 2 | 0 | 0 | 0.532 |
| 21 | 50002 | SR_C | 0 | 0 | 2 | 0 | 0 | 0.532 |
| 22 | 50002 | SSR_A | 0 | 0 | 2 | 0 | 0 | 0.076 |
| 23 | 50002 | SSR_B | 0 | 0 | 2 | 0 | 0 | 0.076 |
| 24 | 50002 | SSR_C | 0 | 0 | 2 | 0 | 0 | 0.15 |
| 25 | 50002 | UR_D | 0 | 0 | 2 | 0 | 0 | 0.05 |
| 26 | 50002 | UR_E | 0 | 0 | 2 | 0 | 0 | 0.05 |
| 27 | 50002 | 21 | 0 | 0 | 2 | 0 | 0 | -40 |

| ITEM NAME | day1 | day2 | day3 | total |
|---|---|---|---|---|
| 11 | 10 | 20 | 130 | 160 |
| 21 | 25 | 40 | 0 | 65 |
| 22 | 25 | 65 | 105 | 195 |
| SR_A | 0.532 | 0.798 | 0.532 | 1.862 |
| SR_B | 0.532 | 0.798 | 0.532 | 1.862 |
| SR_C | 0.532 | 0.798 | 0.532 | 1.862 |
| SSR_A | 0.076 | 0.114 | 0.076 | 0.266 |
| SSR_B | 0.076 | 0.114 | 0.076 | 0.266 |
| SSR_C | 0.15 | 0.225 | 0.15 | 0.525 |
| UR_A | 0.05 | 0.076 | 0 | 0.126 |
| UR_B | 0.05 | 0.076 | 0 | 0.126 |
| UR_D | 0 | 0 | 0.05 | 0.05 |
| UR_E | 0 | 0 | 0.05 | 0.05 |

FIG. 19

| ITEM NAME | day1 | day2 | day3 | total |
|---|---|---|---|---|
| 11 | 40 | 60 | 0 | 100 |
| 21 | 0 | 0 | 40 | 40 |
| 22 | 0 | 0 | 0 | 0 |
| SR_A | 0 | 0 | 0 | 0 |
| SR_B | 0 | 0 | 0 | 0 |
| SR_C | 0 | 0 | 0 | 0 |
| SSR_A | 0 | 0 | 0 | 0 |
| SSR_B | 0 | 0 | 0 | 0 |
| SSR_C | 0 | 0 | 0 | 0 |
| UR_A | 0 | 0 | 0 | 0 |
| UR_B | 0 | 0 | 0 | 0 |
| UR_D | 0 | 0 | 0 | 0 |
| UR_E | 0 | 0 | 0 | 0 |

FIG. 20

| ITEM NAME | day1 | day2 | day3 | total |
|---|---|---|---|---|
| 11 | -30 | -40 | 130 | 60 |
| 21 | 25 | 40 | -40 | 25 |
| 22 | 25 | 65 | 105 | 195 |
| SR_A | 0.532 | 0.798 | 0.532 | 1.862 |
| SR_B | 0.532 | 0.798 | 0.532 | 1.862 |
| SR_C | 0.532 | 0.798 | 0.532 | 1.862 |
| SSR_A | 0.076 | 0.114 | 0.076 | 0.266 |
| SSR_B | 0.076 | 0.114 | 0.076 | 0.266 |
| SSR_C | 0.15 | 0.225 | 0.15 | 0.525 |
| UR_A | 0.05 | 0.076 | 0 | 0.126 |
| UR_B | 0.05 | 0.076 | 0 | 0.126 |
| UR_D | 0 | 0 | 0.05 | 0.05 |
| UR_E | 0 | 0 | 0.05 | 0.05 |

FIG. 21

GAME EVALUATION METHOD, DEVICE, AND APPLICATION EVALUATION METHOD

TECHNICAL FIELD

The present disclosure relates to an evaluation method, an apparatus and a program for a game, and an evaluation method for application software.

BACKGROUND ART

After releasing (launching) a game, it has been done in some games to change parameters necessary for the operation of the game by evaluating sales information such as sales of the game or actual play of the game by players. On the other hand, it has not been done in the related art to evaluate a game from the player's viewpoint before its release (launch), visualize each parameter of the game based on the evaluation, and change or adjust the parameters of the game accordingly.

In the game industry, gameplay assumptions of how players will play a game are often created during the development stage of a new game. It has been partially done to simulate how many items are acquired and consumed by the player over time or how much the player's status grows based on the master's parameter settings for the created gameplay assumption.

For example, if the items to be acquired in quest chapter 1-1 of a game are set to be 1 item A and 5 items B, then if you play quest chapter 1-1 five times, the number of items you can earn in quest chapter 1-1 is 1 item×5 times=5 items, and item B is 5 items×5 times=25 items, and so on. However, such simulation was not done in practice because it is a complicated and time-consuming process when the number of quests and items is large.

Patent Literature 1 describes evaluating the timing of the player's operation input after the game is sold and changing the difficulty level of the game based on the evaluation. However, PTL 1 does not disclose evaluating and adjusting game parameters before the game is sold (PTL 1)

CITATION LIST

Patent Literature

PTL 1
  Japanese Patent Application Laid-Open No. 2019-457

SUMMARY OF INVENTION

As mentioned above, it is possible to create a game play assumption and calculate the amount of items and other items to be acquired in each content based on that play assumption. However, for example, if there are also 10 quests in a chapter and there are 10 chapters, then 10 quests×10 chapters, which means that there are a total of 100 contents. In such a case, if we try to create a play assumption, it is necessary to create 100 detailed play assumptions for 100 contents. In addition, in a normal game, there are various contents other than quests, and it is too time-consuming and impractical to create detailed play assumptions for each of those contents in terms of difficulty and stages. Therefore, such simulations have often not been conducted prior to the sale of a game, or if they have been conducted, they have been partial and limited.

On the other hand, only the acquisition amount items are able to be visualized in the aforementioned conventional operation. The consumption amount of items depends on how the character is strengthened, so the consumption amount of items depends on the situation, such as how the character is trained. What is important in balancing the game is the balance between the acquisition amount of items and the consumption amount of items, rather than the acquisition amount of items alone. When calculating the balance of such items, it is necessary to calculate the acquisition amount of items and the consumption amount of items separately and compare them to determine whether the balance is appropriate, which requires more time and effort.

In addition, there are cases where each parameter in the file of a master that describes parameter setting values, etc., is intricately related to other parameters in nesting structures among multiple masters. For example, when calculating the items that can be obtained in quest chapter 1-1, quest chapter 1-1 is further divided into three stages, and monsters appear as enemies in each stage. When the monsters are defeated, three treasure chests, gold, silver, and bronze, will appear at a predetermined rate, and when the chests are opened, the player will obtain a set of items corresponding to each chest. The item composition of these sets of items usually includes multiple items, such as items A, B, C, etc., and consequently simply calculating how many items to be received when completing the quest is complicated. In addition, because there is considerable diversity in the configuration of treasure chests depending on the content and game, different simulation logics must be used not only for different games, but also for different contents even within the same game, thus making the simulation a complicated and time-consuming and labor-intensive process For these reasons, it takes an enormous amount of man-hours or time to determine the overall balance of the game, including the balance of items. In addition, for example, when determining the acquired amount of item A, simultaneous simulation cannot be made because in most cases the same item A can be acquired from multiple different contents, and the structure of the master file differs for different contents as described above. Therefore, the simulation results for each content had to be calculated separately, and it was a very time-consuming task to show the number of items obtainable from each content in a single graph.

When trying to simulate the balance of a game, it took an enormous amount of man-hours to create detailed play assumptions, and different games, contents, and functions required different simulation logic to be created each time to perform the simulation. As a result, in the related art, it has been virtually impossible to create comprehensive and detailed simulations of the overall game balance.

Ultimately, if a game is unbalanced, the result is likely to be unstable or unexpectedly low monthly sales of that game, resulting in stagnation of the total revenue derived from that game.

Technical Problem

A problem to be solved by the present disclosure is that, as described above, the sales of the game cannot be maximized by preliminarily adjusting the parameter of the game and optimizing the parameter by visualizing the balance of the item before the launch of the game.

Solution to Problem

An evaluation method for a game according to the present disclosure includes: by a computer, (A) calculating multiplication of an expected value of acquisition and consumption of an item when a player performs an action, and an assumed number of times of the action performed by the player on a basis of a parameter of a master; and (B) visualizing a balance of the item on a basis of a result of the multiplication.

These comprehensive or specific aspects may be realized in a system, device, method, integrated circuit, computer program, or recording medium, or in any combination of a system, device, method, integrated circuit, computer program, and recording medium.

Advantageous Effects of Invention

According to the present disclosure, before the release of the game, the balance of the game can be easily evaluated by simulating the balance of the game, and adjustment required for each parameter can be made. Through the above-described parameter adjustment before the launch of the game, the game can generate consistent monthly sales, resulting in greater total revenue from the game.

BRIEF DESCRIPTION OF DRAWINGS

FIG. 4 is a diagram illustrating an example of visualization of a parameter achieved by organizing a master;

FIG. 9 is a diagram illustrating a known non-standard master with a nesting structure;

FIG. 11 is a table illustrating the number and weight of each item in an organized manner with FIG. 10 illustrating the standard master of the present disclosure;

FIG. 12 is a diagram illustrating an expected value of each item calculated from FIG. 11 illustrating an output to which the present disclosure is applied;

FIG. 13 is a diagram illustrating a non-standard master;

FIG. 14 is a diagram illustrating the non-standard master of FIG. 13 converted to a standard master to which the present disclosure is applied;

FIG. 15 is a diagram illustrating an output of the standard master illustrated in FIG. 14 to which the present disclosure is applied;

FIG. 16 is a diagram illustrating an expected value list of the standard master illustrated in FIG. 14 to which the present disclosure is applied;

FIG. 17 is a diagram illustrating a play assumption;

FIG. 18 is a diagram illustrating the number of acquired items of each day in each action;

FIG. 19 is a diagram illustrating the total number of each item acquired each day according to a play assumption;

FIG. 20 is a table for describing a consumed amount of items;

FIG. 21 is a table illustrating a balance of each item; and

DESCRIPTION OF EMBODIMENTS

Figure 1:
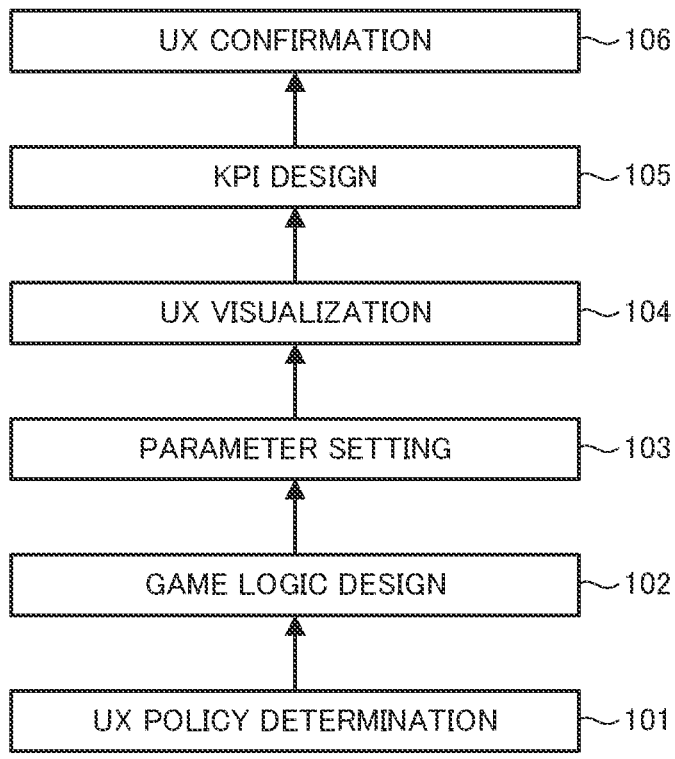
FIG. 1 is a diagram illustrating a procedure of a level design of a game.

In this specification, "game" includes all types of computer games using given computers, and includes, without limitation, arcade games, consumer games, video games, handheld games, computer games, cell phone games, smartphone games, and social games.

In this specification, for convenience of description, social games will be used primarily as examples of games, but the application of the present disclosure is not limited to social games and is applicable to all types of games.

In this specification, "social game" refers to an online game enjoyed by one user or one or more groups of users, and includes elements such as community and cooperation or competition among users. For example, social games involve actions such as building farms and cities, collecting cards and battling with decks, and solving specific puzzles to advance through stages in the game. The basic fee to play social games is usually free, and the game provider makes a profit in the form of charges for purchasing items. Social games are also called "social-games".

Since basic terminology in the social game field is not necessarily uniformized among game makers, terms used in this document are defined as follows.

The "character" is a person, animal, robot, machine, or fictional animal that appears in a game, and is controlled by the player to make the game work and involved in the story of the game. The "character" is also called "chara" or "game character".

The "gacha" is the name given to a machine originally called "gacha-gacha" or "gachapon," which is used in games to obtain items and the like by drawing them at random. Usually, "gacha" is partially free and partially paid-for.

The "card" is a kind of alter ego of the player used in the game. Multiple cards are collected to create a deck (or team), which is used to play against enemies or other players in the game. Cards are also called monsters in some games.

The "card" generally has four elements: "rarity", "cost", "parameter" and "skill". The "rarity" is the rarity value of a card. Generally, the rarer a card is, the harder it is to obtain, i.e., the lower the probability of drawing it, and the more expensive it is. The "cost" is used as the "cost limit", which is the upper limit of the overall cost of the cards when multiple cards are arranged in a deck. The "parameter" is a value representing the strength associated with a card. Generally, other values such as "attack power" or "defensive power" are set. The higher the "attack power," the more damage a card can inflict on an opponent, and the higher the "defensive power", the less damage a card can inflict from an opponent of the same attack power. The "skill" is unique abilities that a card can use. For example, it can increase the own attack power or enable the first attack.

The "quest" is an assignment that is issued to a player and used, for example, to help a character in need.

The "stage" is a unit of a game and is a segment.

The "dungeon" is an area where monsters appear and other tricks are used, and dungeon is a highlight of the game.

The "chapter" is a break, synonymous with a stage.

The "item" is any tool that a character can own in the game.

The "magic stone" is one of the items and acts as a kind of currency in the game. Magic stones can be used, for example, for gacha, continue function, stamina recovery, and the like.

The "boss" is the guardian of each stage, and by defeating this boss, players can advance to the next stage.

FIG. 1 is a diagram illustrating a procedure of a level design of a game. In general, in game development, the "level design" refers to the process of adjusting the difficulty (i.e., numerical values) of various parameters used in a game. In social games and other applications, there is a strong preconceived idea that level design=parameter setting. However, in this specification, a series of steps from the definition of the upstream UX (User eXperience: user experience) policy, i.e., what kind of experience to deliver to the user, to the subsequent steps including data analysis is defined as level design.

If there are problems with upstream UX (user experience) policy determination 101 and game logic design 102, it may be difficult to increase sales no matter how adjusting parameter setting 103. In addition, when whether parameter setting 103 satisfies the UX (user experience) is not analyzed and confirmed, appropriate parameter adjustment may not be made.

In this specification, as illustrated in FIG. 1, the level design includes steps of UX (user experience) policy determination 101, game logic design 102, parameter setting 103, UX (user experience) visualization 104, KPI design 105, UX (user experience) confirmation 106 and the like. While the six steps are illustrated in FIG. 1 for convenience of description, the steps may be further divided, and some of the six steps may be integrated.

In the present specification, the definition of the upstream UX policy determination 101, i.e., what kind of experience to deliver to the user, and the series of subsequent steps including data analysis are included in the level design.

UX policy determination 101 is a phase of determining the policy of user experience, i.e., the specification of the game.

In game logic design 102 as the next step, a mechanism that users can enjoy is considered based on the UX policy determined at step 101. Specifically, the logic, expressions, and the like for achieving the determined UX policy are considered. For example, in a scene intended to enjoy a battle in a group, the number of people to fight, the time required, the kind of attack methods and the like correspond to the game logic. On the other hand, for the character development, determining the kind of restriction, the trial and error to be made and the like is included in game logic design 102.

In game logic design 102, regarding the expression representing the difficulty, UXs (user experiences), such as whether the difficulty is monotonically increased with time, whether the increase of the difficulty is accelerated from the latter half of the game, and whether the difficulty is finally converged to a certain value, are considered based on the expressions and the like. If the game logic is broken or the setting of the expression representing the difficulty is inadequate, it would be difficult to implement a game that sells based on such a game logic no matter how good the UX policy determined in the upstream of the level design.

In parameter setting 103 as the next step, an operation of applying numerical values to each parameter on the basis of the UX policy determined so far and the game logic designed so far is performed. In this parameter setting 103, the general framework of the UX policy needs to be converted into parameters in a quantitative manner.

For example, in the case of a city-building game, a UX policy such as "that accident unexpectedly and frequently occurs and the resulting damage is significant, which provides thrilling experiences" is assumed for a certain accident to be caused. In this case, the part "unexpectedly and frequently occurs" may be quantified as e.g., "occurs once every 60 minutes", and the part "the resulting damage is significant" may be quantified as e.g., "up to 70% of the player's possessions will be lost". In addition, the part "thrilling" may be set with a certain range, such as "damage fluctuates randomly each time between 10% and 70% of the player's possessions".

By determining the UX policy in this manner, the player of this game can experience "thrilling experience", which is the determined UX policy. In addition, by repeating the quantification of the UX policy into parameters, parameter setting 103 that causes less errors can be achieved.

In the next step, UX visualization 104 is performed. In UX visualization 104, whether the set value of the parameter is in accordance with the determined UX policy is visualized and confirmed. In this case, accidents of parameter setting errors can be considerably reduced by preliminarily visualizing the UX in the numerical level so as to enable the confirmation of the parameter, while the testplay of this game by the player is required. For example, the UX is roughly expressed in numerical values such as "how many days does it take to develop a certain character". In this case, the UX can be visualized by performing a simulation, and organizing a master that describes each parameter, for example.

Through the visualization of the UX by using a simulator, a mechanism for preventing reduction in sales due to parameter setting errors during operation can be provided.

For example, in a scene of acquiring an item by entering a certain dungeon of a certain game, how many items can be acquired and how long the time it takes in that dungeon are important UXs (user experiences). This can be visualized by organizing the master, and may lead to prevention of accidents due to parameter setting errors.

Next, in KPI design 105, it is necessary to design a KPI (Key Performance Indicator), and make a preparation for confirming the difference between the assumed UX and the actual UX based on actual game play. For example, in the case where game assumptions are made in an image of "how many times in one day and how many days the heavy users play it in order to complete the quest so far", the number of times that player group plays and the quest completion status are KPIs for confirming the UX.

In UX confirmation 106 as the last step, whether the assumed UX is provided is confirmed while viewing the above-described designed KPI before the release of the game. In the UX confirmation 106, when the UX determined at UX policy determination 101 is not provided, the process is returned to game logic design 102 to reset the game logic, or the process is returned to parameter setting 103 to readjust the parameter.

Figure 2:
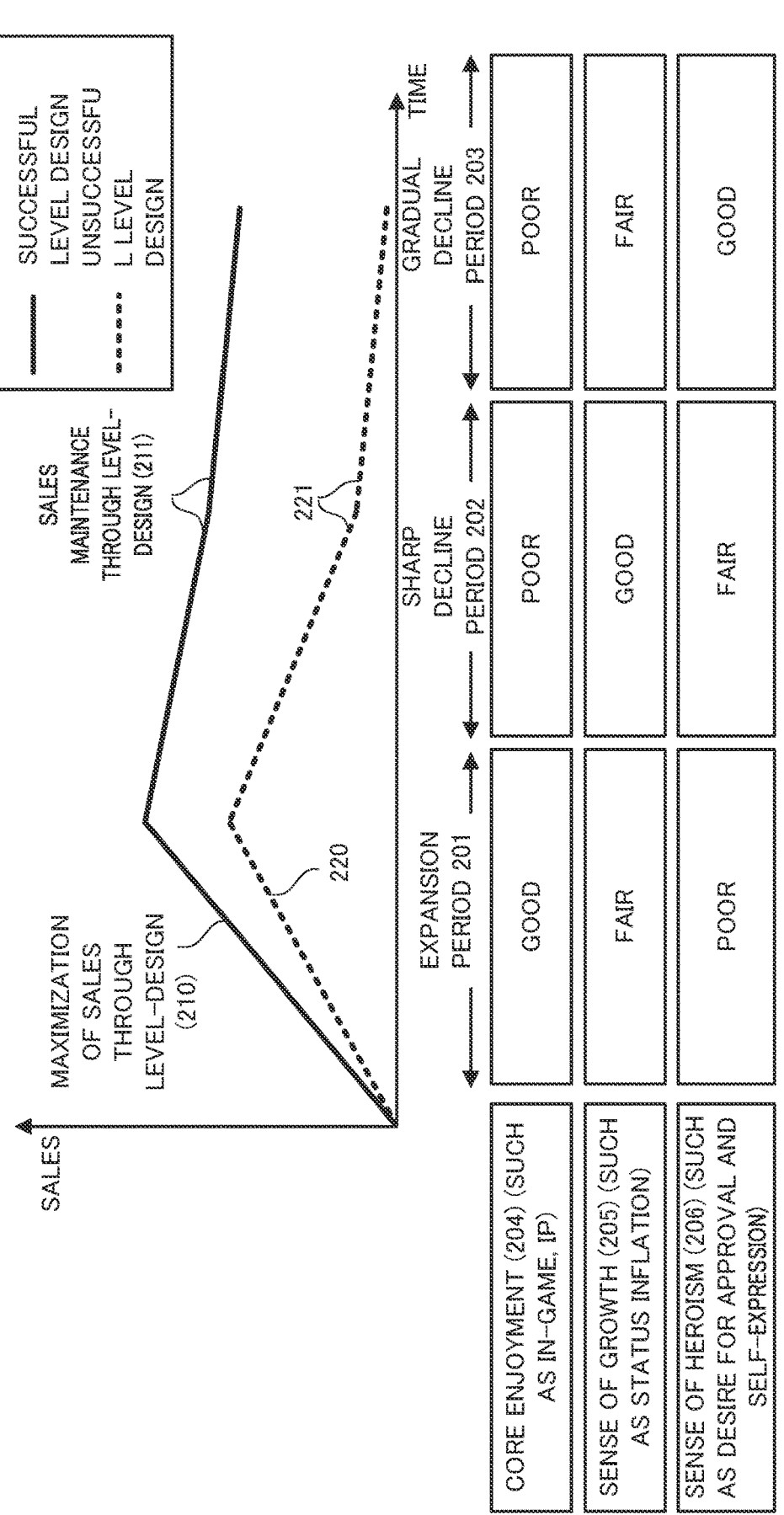
FIG. 2 is a diagram illustrating a basic pattern of sales trends of a social game.

FIG. 2 is a diagram illustrating a basic pattern of sales trends of a social game. In FIG. 2, the abscissa indicates time, and the ordinate indicates the sales of the social game.

As illustrated in FIG. 2, there are three phases regarding the sales of the game, namely, "expansion period 201", "sharp decline period 202" and "gradual decline period 203" in this order after the launch of the game. The first phase after the launch of the game is "expansion period 201" where both the number of users and the average amount of customer spend sharply increase, and as a result the sales of the game sharply increases. The next period is "sharp decline period 202" where the number of users sharply decreases and the sales sharply declines. The last period is "gradual decline period 203" where the number of users decreases to a certain degree and further the sales gradually decrease.

In the case of favorable games, or in other words, games that sell, the number of users and the sales gradually increase after the release, and the reduction in sales is moderate even after the maximum sales peak (i.e., there is no suddenly drop in sharp decline period 202). On the other hand, in the case of games that do not sell, in many cases, the number of users and the sales slowly increase after the release, and the number of users and the sales quickly decrease after reaching the peak maximum sales that is not so high.

The maximum value (peak value) of the sales largely depends on the potential of the game itself, i.e., the attraction of the game itself, but a well-designed level design (also referred to as level-design) can boost the maximization of sales in expansion period 201 and prevent the user abandonment and sales reduction to some extent in sharp decline period 202 or gradual decline period 203 after the peak of the sales, and as a result, considerable gains can be made in the long run.

FIG. 2 illustrates an example of a successful level design (level-design) of a game (solid line) and an example of an unsuccessful level design (level-design) of a game (broken line). In the example of successful level-design (solid line), the sales are maximized due to the successful level-design in expansion period 201 (reference numeral 210), and the sales do not sharply decrease and can be maintained to a certain level also in sharp decline period 202 and subsequent gradual decline period 203 (reference numeral 211).

Unlike the above-described example of successful level-design (solid line), in the example of unsuccessful level-design (broken line), the maximum value of the sales does not so much increase and the peak value of the sales is also low (reference numeral 220) in expansion period 201. Further, the decrease of the sales is sharp in the subsequent sharp decline period 202 and gradual decline period 203 (reference numeral 221). As a result, in the example of unsuccessful level-design (broken line), the total sales from the start of the launch to the final close of the launch are smaller than those of the example of successful level-design (solid line).

Before the release of the game, whether it sells in the first place, i.e., the maximum amount of sales over a given period of time, tends to be considered important, but unlike in the related art, proper level design is now more important than ever, as it is becoming more critical to maintain sales once achieved.

There are some important factors related to the three phases, expansion period 201, sharp decline period 202 and gradual decline period 203 illustrated in FIG. 2. First, "core enjoyment (204)" makes a large contribution in first expansion period 201. Core enjoyment (204) refers to the enjoyment of the in-game itself of application software, the attractions of IP, character, worldview and the like. Even in in-game, game logic and parameter settings can increase the enjoyment, but inevitably some of core enjoyment (204) may be beyond the control of level design alone.

With reference to the lower table of FIG. 2, the importance of core enjoyment (204) of the game of the in-game, IP and the like are high (good) in expansion period 201, and the importance of the core enjoyment (204) of the game is low (poor) in sharp decline period 202 and gradual decline period 203.

The importance of "sense of growth (205)" due to the inflation of the status and the like is high (good) in sharp decline period 202, and moderate (fair) in expansion period 201 and gradual decline period 203.

The importance of "sense of heroism (206)" due to the desire for approval and self-expression tends to gradually increase over time in the order of expansion period (poor), sharp decline period (fair), and gradual decline period (good).

The sales of each game naturally depend on the potential of the game itself, i.e., the attraction of the game itself, but even with the same game, the sales can be maximized at an earlier stage in expansion period 201 by appropriately designing the level design, and the revenue obtained from a single game can be maximized by suppressing the decline in the subsequent sharp decline period 202 and gradual decline period 203.

The factor "sense of growth (205)" is important in sharp decline period 202. In short, it is important that players always experience the feeling that the more they play the game, the stronger they become. For example, in card games, this corresponds to the inflation of the status of the card (in other words, a phenomenon in which status and firepower continue to increase over time), but it is also important to create a mechanism that feedbacks a solid sense of strength to players, instead of the inflation alone.

The factor "sense of heroism (206)" is important in the last gradual decline period 203. The sense of heroism (206) means whether the player can have a feeling that he or she is playing an active role. For example, this corresponds to a fact that the player receives a high ranking in the game ranking, or a fact that other players think that the player has good cards and characters and is amazing.

In particular, for games with high and long-lasting sales, the design of this sense of heroism (206) is extremely important in the long run. When players themselves feel the sense of heroism (206), they are more likely to play the game longer and pay more fees, which leads to increase in sales and suppression of reduction in sales.

The three important factors, core enjoyment (204), sense of growth (205) and sense of heroism (206) are not completely separable from each other, but can be generally considered to correspond to the three phases, expansion period 201, sharp decline period 202 and gradual decline period 203, respectively.

Figure 3:
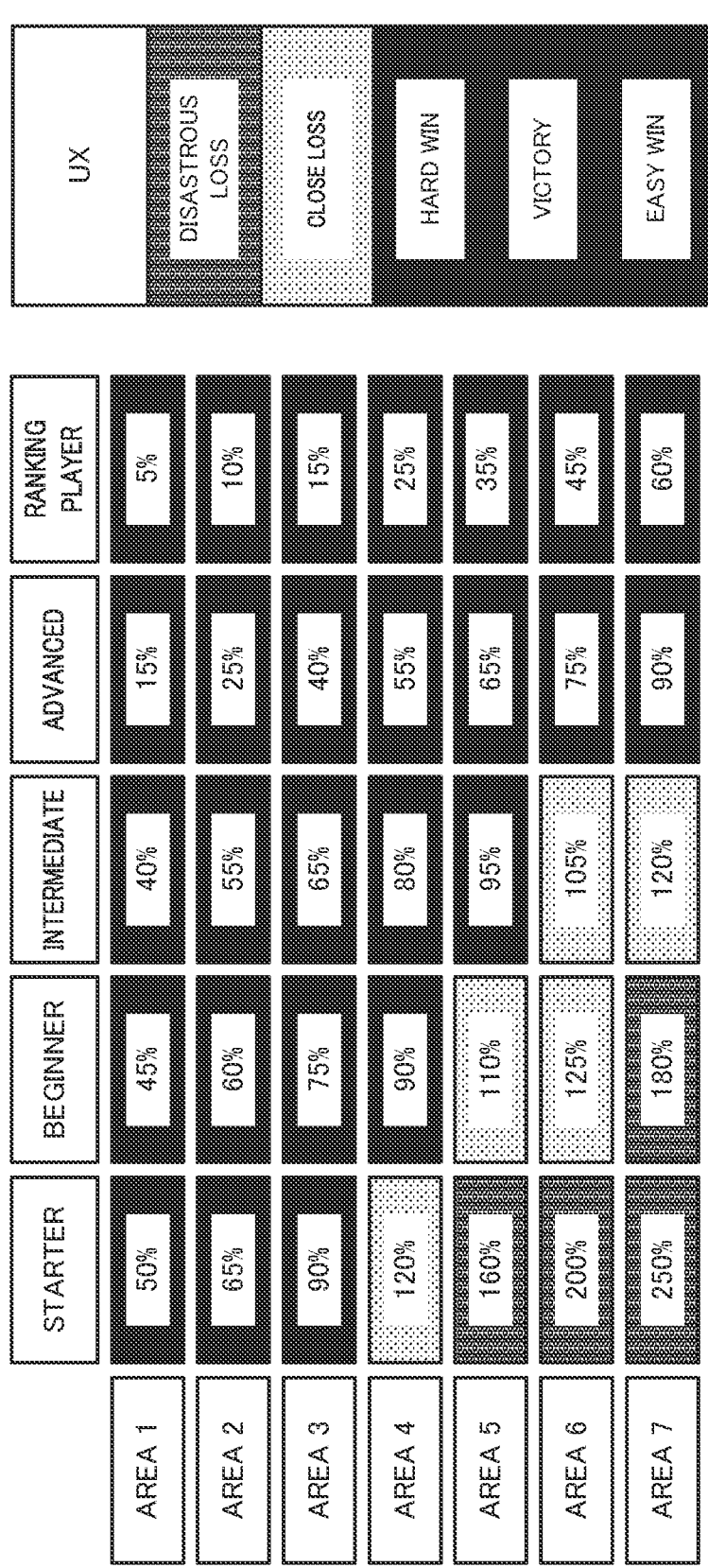
FIG. 3 is a diagram illustrating the amount of damage of players of each group when attacking a certain dungeon of a certain game.

FIG. 3 illustrates the amount of damage, i.e., win rate, of a player of each group when attacking a certain dungeon of a certain game. The abscissa of the table indicates five levels, i.e., the starter, beginner, intermediate, advanced, and ranking player in the order from worst to best at the game. The ordinate of the table indicates, from the top, seven areas of the game from area 1 to area 7. FIG. 3 illustrates win and lose of players of each level in each area, in win rate (%). In addition, with reference to the example on the right side in of FIG. 3, the win rate is classified in five levels, i.e., from the top, disastrous loss, close loss, hard win, victory, and easy win in the order from the lower win rate to the higher win rate as the UX (user experience).

For example, in the case of an RPG (roll playing game) of searching multiple areas, the amount of damage (i.e., the amount of damage) that a player or party takes in each group before clearing each area is simulated. In FIG. 3, the boundary between win and lose is defined as 100% in the amount of damage, and it is assumed that it is lose when the amount of damage exceeds 100 whereas it is win when the amount of damage is 100 or smaller. In this simulation, for example, the beginner cannot clear area 5 (the amount of damage is 110%, i.e., close loss), but barely clears area 4, which is one level lower than area 5 (the amount of damage is 90%, i.e., hard win).

On the other hand, the advanced easily clears area 3 (the amount of damage is 40%, i.e., easy win), barely clears area 6 (the amount of damage is 75%, i.e., hard win), and barely clears area 7 (the amount of damage is 90%, i.e., hard win).

In this manner, the UX is comprehensively visualized by the list of the levels of the player and the difficulty of each area (i.e., the amount of damage), and thus parameter accidents due to parameter setting errors can be considerably reduced by visualizing the parameter as in FIG. 3.

A cause of considerable reduction in sales during actual game operation is often that the above-described parameter setting is not working. For example, a situation where long-term sales are not as high as expected may actually occur due to parameter setting errors such as that the balance of the sense of growth is lost due to excessive distribution of important items, and that the sense of heroism is impaired due to lost balance of a specific character.

The direct cause for this is eventually parameter setting errors, but directly, the cause may be that the visualization of the UX (user experience) is not made.

FIG. 4 is a diagram illustrating an example of visualization of a parameter by organizing a master (or master file) defining a parameter. The left table (410) in FIG. 4 lists quest ID, item ID, and amount, in this order from the left side, included in the master of the game. The right table (420) is a table obtained by organizing the items for each quest on the basis of this left table (410). Right table (420) lists ID, item name, and quest name from left side, and further a large group of quest names includes specific quest names, i.e., meadow, cave, and mine.

For example, in the row of ID=1 in right table (420) of FIG. 4, the item name is medicinal plant, and the number of medicinal plants is one in the meadow, two in the cave, and three in the mine. Likewise, in the row of ID=2, the item name is small recovery medicine, and the number of the small recovery medicines is two in the cave and zero in the meadow and the mine. In the row of ID=3, the item name is fragment, and the number of the fragments is one in the meadow and zero in the cave and the mine. For the IDs 4 to 6, the numbers of iron ores, precious stones, and cards in each quest are shown in the right table (420).

With right table (420) created by organizing left table (410) of the master format of the game for each item in the above-described manner, the number of items that can be acquired in each quest can be easily determined from left table (410).

Figure 5:
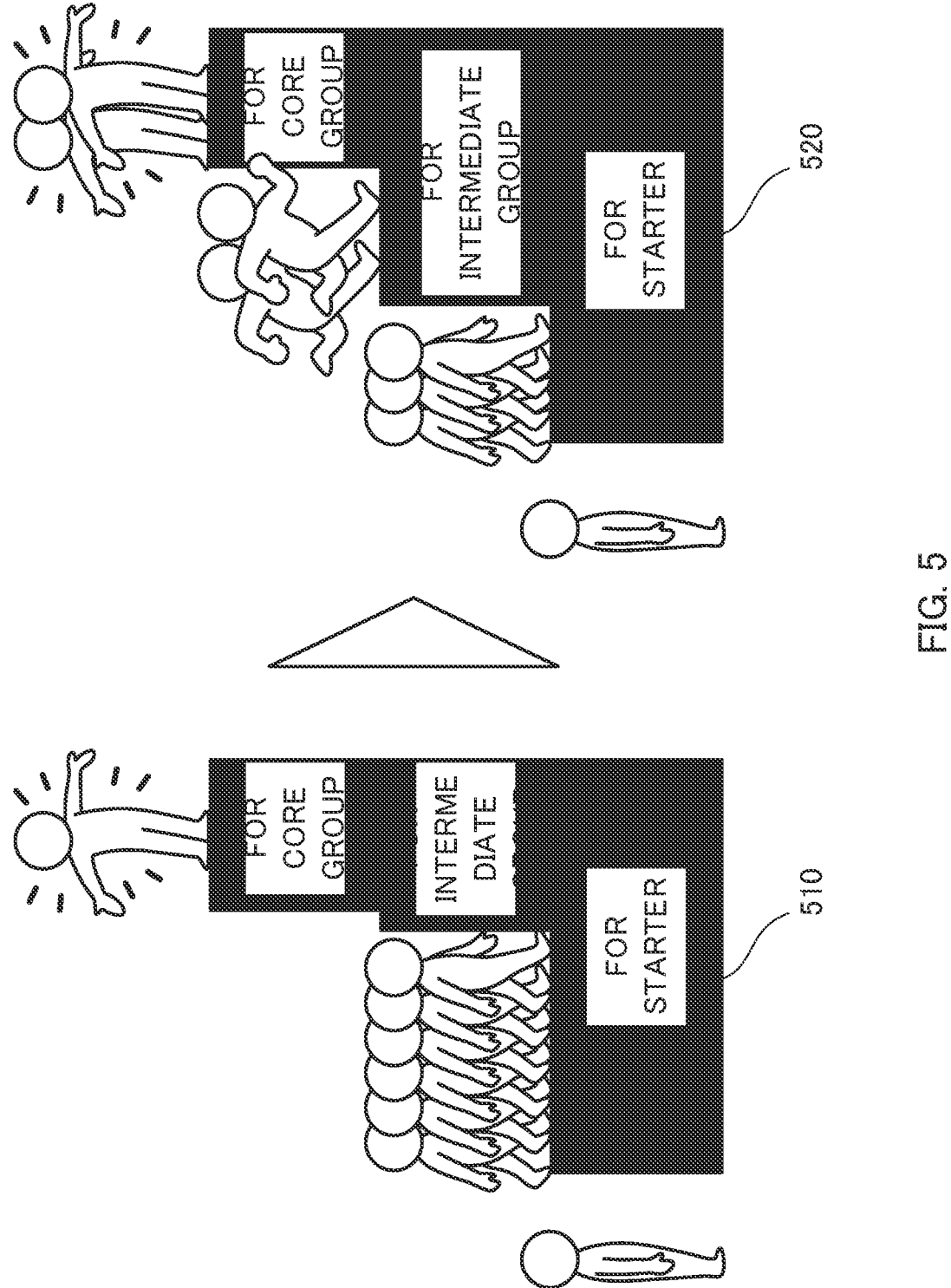
FIG. 5 is a diagram illustrating an example case where an operation of a game is improved by applying the present disclosure.

FIG. 5 is a diagram illustrating an example case where an operation of a game is improved by applying the present disclosure. When designing a game, it is necessary to categorize the users into some categories, and prepare contents that players of each category can enjoy. In the example illustrated in FIG. 5, for simplicity's sake, the users are categorized in three categories, i.e., starter, intermediate group, and core group (advanced) on the basis of game proficiency.

For example, a situation may possibly occur where when the difficulty for each user group of a game is evaluated at an initial phase of the game design before the launch, the number of players who can clear the content intended for starters is large, whereas the number of players who can clear the content intended for intermediate groups is small as shown in left diagram (510) of FIG. 5. In this case, a situation may be anticipated where players are stopped at the intermediate group in the middle of the entire process of the game. In such a situation, especially intermediate group players cannot move up to higher core groups, and the willingness to continue this game is reduced. This reduces the sales from numerous intermediate group players, and reduces the sales of the game as a whole.

In the case where the players of groups who can clear are imbalanced as in left diagram (510) of FIG. 5, it is possible to balance the number of players who can clear the contents of respective levels intended for starter, intermediate group and core group by making the contents intended for the intermediate group easier than that of the left diagram (510) by applying the parameter evaluation of the present disclosure to the game before the launch. In right diagram (520), the content intended for the intermediate group is made easier than in left diagram (510), and as a result, the number of players who can clear the contents intended for the intermediate group is increased (i.e., the number of players who can challenge the content intended for the core group is increased). Thus, the number of intermediate group players who continuously play it increases, and the entire revenue obtained from the game can be further maximized.

Figure 6:
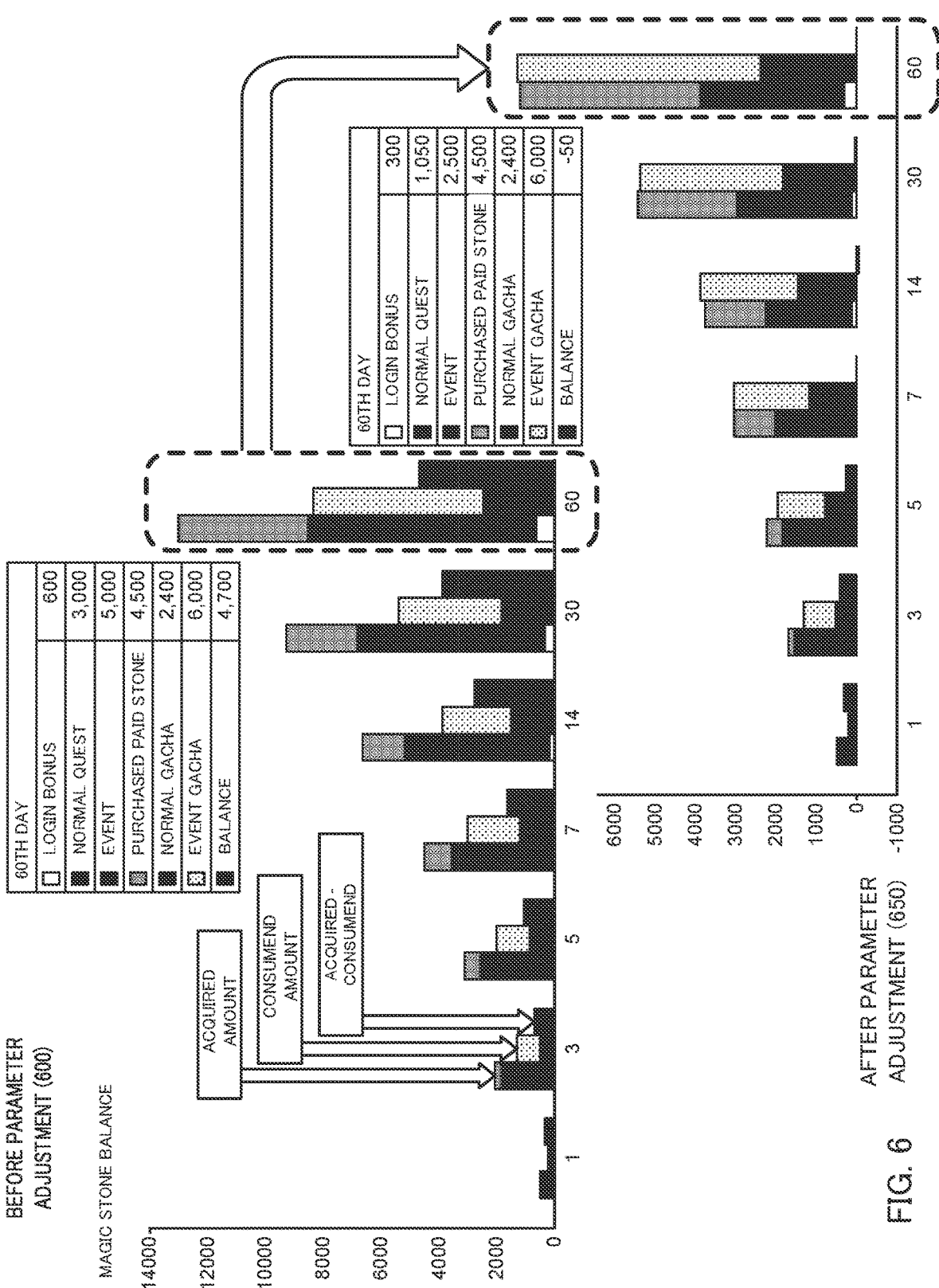
FIG. 6 is a diagram illustrating a balance of magic stones before and after the present disclosure is applied.

FIG. 6 is a diagram illustrating a balance of magic stones in a game before and after the present disclosure is applied. As described above, a magic stone is an item that functions as a currency in a game. In diagram (600) before the adjustment of the parameter before the application of the present disclosure and diagram (650) after the parameter adjustment after the application of the present disclosure, the abscissa indicates the number of playing days, from the first playing day on the leftmost side to the 60th playing day on the rightmost side. In diagram (600) before the application of the present disclosure and diagram (650) after the application of the present disclosure, the ordinate indicates the balance (number) of magic stones. In each drawing, the leftmost bar of the three bars of each playing day indicates the acquired amount of the magic stone, the center bar indicates the consumed amount of the magic stone, and the rightmost bar indicates a difference (balance) obtained by subtracting the consumed amount from the acquired amount of the magic stone. Left diagram (600) and right diagram (650) of FIG. 6 show that in each case, the acquired amount and consumed amount of the magic stones increase with the number of playing days of the game by the player.

The diagram 600 before the application of the present disclosure shows that as the number of playing days increases as one day, three days, five days, seven days, 14 days, 30 days, and 60 days, the balance (acquisition–consumption) increases. In addition, at the time point of 60th playing day, the acquired amount is 13100, which is the sum of 4500 of the purchased paid stone, 5000 of the event, 3000 of the normal quest, and 600 of the login bonus. With reference to the diagram 600 before the application of the present disclosure, at the time point of 60th playing day, the consumed amount is 8400, which is the sum of 6000 of the event gacha (event-gacha) and 2400 of the normal gacha (here, free gacha is not considered). Therefore, the balance, acquired amount–consumed amount, at the time point of the 60th playing day before the application of the present disclosure is 4700.

On the other hand, the diagram 650 after the application of the present disclosure shows that as the number of playing days increases as one day, three days, five days, seven days, 14 days, 30 days, and 60 days, the balance finally decreases while there are some increases and decreases after the balance increases at the third day. In addition, at the time point of 60th playing day, the acquired amount is 8350, which is the sum of 4500 of the purchased paid stone, 2500 of the event, 1050 of the normal quest, and 300 of the login bonus. With reference to the diagram 650 after the application of the present disclosure, at the time point of 60th playing day, the consumed amount is 8400, which is the sum of 6000 of the event gacha (event-gacha), and 2400 of the normal gacha. Therefore, the balance, acquired amount–consumed amount, after the application of the present disclosure is −50.

In this manner, the balance at the 60th playing day before the application of the present disclosure is 4700, and the acquired amount and the consumed amount of the magic stones is imbalanced (i.e., the consumed amount is too small relative to the acquired amount). On the other hand, the balance at the 60th playing day after the application of the present disclosure is −50, that is, the difference between the acquired amount and the consumption amount of the magic stones is small (i.e., the consumed amount and the acquired amount is well balanced) and the consumed amount of the magic stone is large. Thus, the fee payment of gacha is facilitated and the revenue from this game can be maximized.

Figure 7:
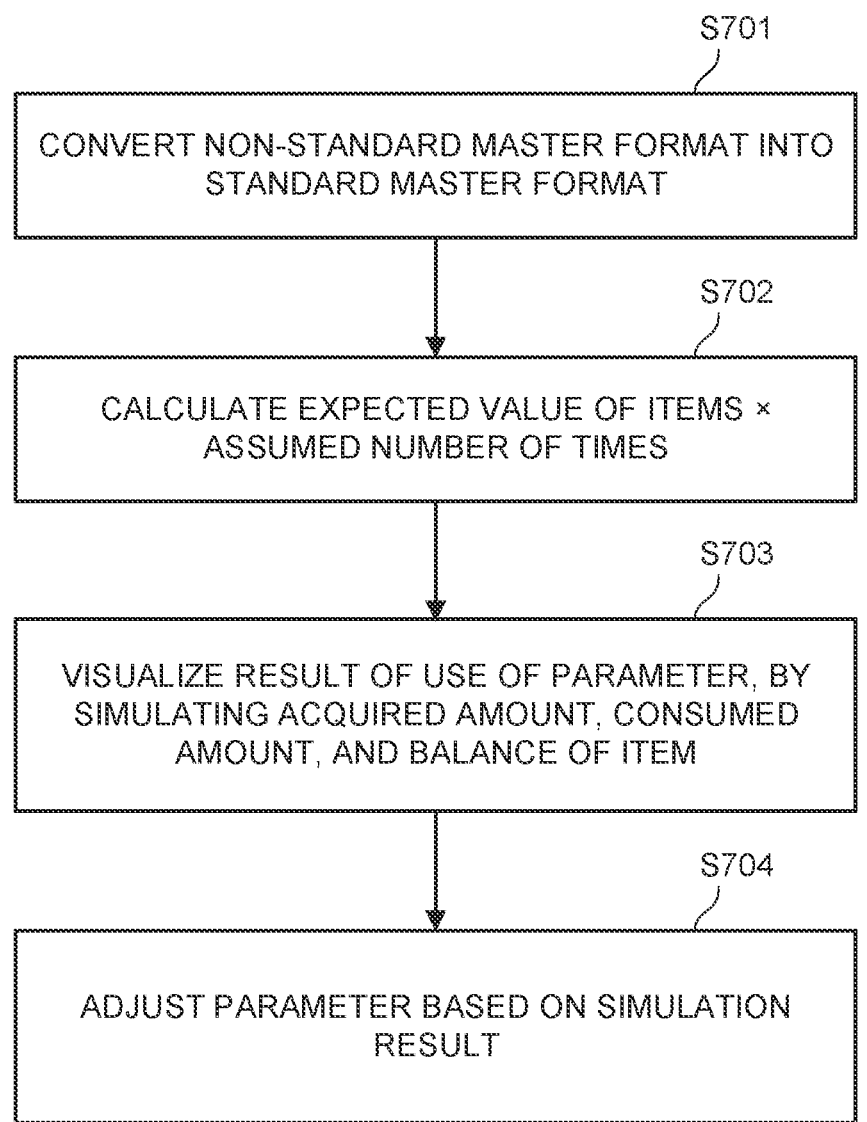
FIG. 7 is a flowchart illustrating an application procedure of the present disclosure.

FIG. 7 is a flowchart illustrating an application procedure of the present disclosure. Here, "master" refers to data in a tabular or other format that describes parameters and other data used in the game, and "master format" refers to the format (format) used in this master.

In some cases, only one master describes the parameters of all the elements used in the game, but usually the contents of the parent master are further described in stages by child masters, grandchild masters, etc. In such cases, the master has a nesting structure with multiple levels. When the master has a nesting structure, for example, items in the parent master are further specified in more detail in the child masters, and in such cases, the details of the item cannot be determined by looking at the parent master alone.

First, when executed by a computer, the program of the method of the present disclosure converts a master of a non-standard master format into a standard master format to which the present disclosure is applied (S701). The conversion of a non-standard master format into the standard master format (S701) may be executed using a computer, or may be manually executed. Normally, all masters used in a game is provided in a non-standard master format from a game developer. Even among games developed by the same game developer, different games or different versions of the same game often have non-uniform master formats, and have different master formats. The standard master format is the same format that is uniformized for different game production companies, games, or game versions.

The expected value×assumption of each element (for example, item) is calculated by using the master converted to the standard master format (S702). Here, the expected value is a value of acquiring and consuming each item when a player makes a certain action, and the assumed number of times is an assumed number of times of actions performed by a player. It is possible to predict the number of certain items to be acquired in a certain content by calculating the expected value x assumption, for example.

Next, a result of the use of the targeted parameter can be visualized by simulating the acquired amount, the consumed amount, and the balance of the acquired amount and the consumed amount of the item, and visualizing the result (S703). The above-described diagram (600) illustrated in FIG. 6 is a diagram obtained by visualizing the result of the simulation of the acquired amount, the consumed amount and the balance of the item, for example.

Finally, the parameter is adjusted on the basis of the balance of the item visualized by the simulation result and the like (S704). More specifically, it is determined whether the balance of the acquisition and consumption of the item is balanced at each elapsed day from the game start in the diagram (600) illustrated in FIG. 6. Diagram (600) of FIG. 6 shows that at the 60th elapsed day, the acquired amount is large relative to the consumed amount, and the balance is imbalanced at +4700, for example.

By applying the present disclosure, the developer of the game can improve the balance of the item by appropriately adjusting each parameter in the master while viewing the imbalanced balance in the upper left diagram (600) of FIG. 6. Lower right diagram (650) of FIG. 6 illustrates an improved result of the balance obtained by adjusting the parameter in the above-described manner. Lower right diagram (650) of FIG. 6 shows that the balance is stricken (i.e., the height of the bar of the balance is relatively lower than the heights of the bar of acquired amount and the bar of consumed amount) at each playing day elapsed after the game start, especially after 7th day, and that the parameter after the adjustment is more appropriate in terms of the maximization of sales.

After the parameter is adjusted at S704, the process may be optionally returned to S702 so as to calculate the value of the expected value x assumption again on the basis of the parameter after the adjustment, simulate the balance of the item again on the basis of the result calculated anew at S702, visualize the parameter again at S703, and adjust the parameter again at S704 on the basis of the result of that simulation when the parameter requires further fine adjustment as a result.

The steps from S702 to S704 may be repeated again when required as a result of the readjustment of the parameter.

Figure 8:
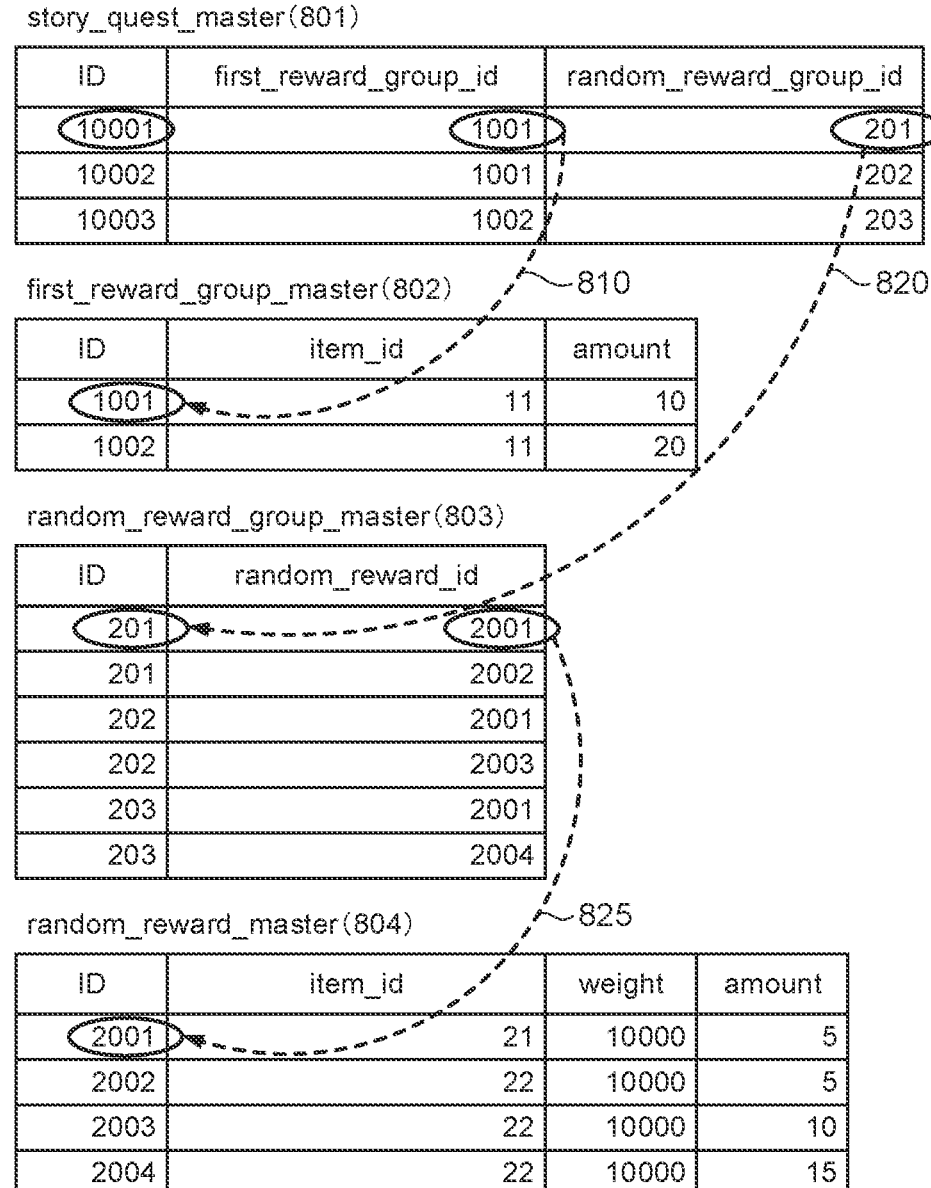
FIG. 8 is a diagram illustrating a known non-standard master with a nesting structure.
Figure 10:
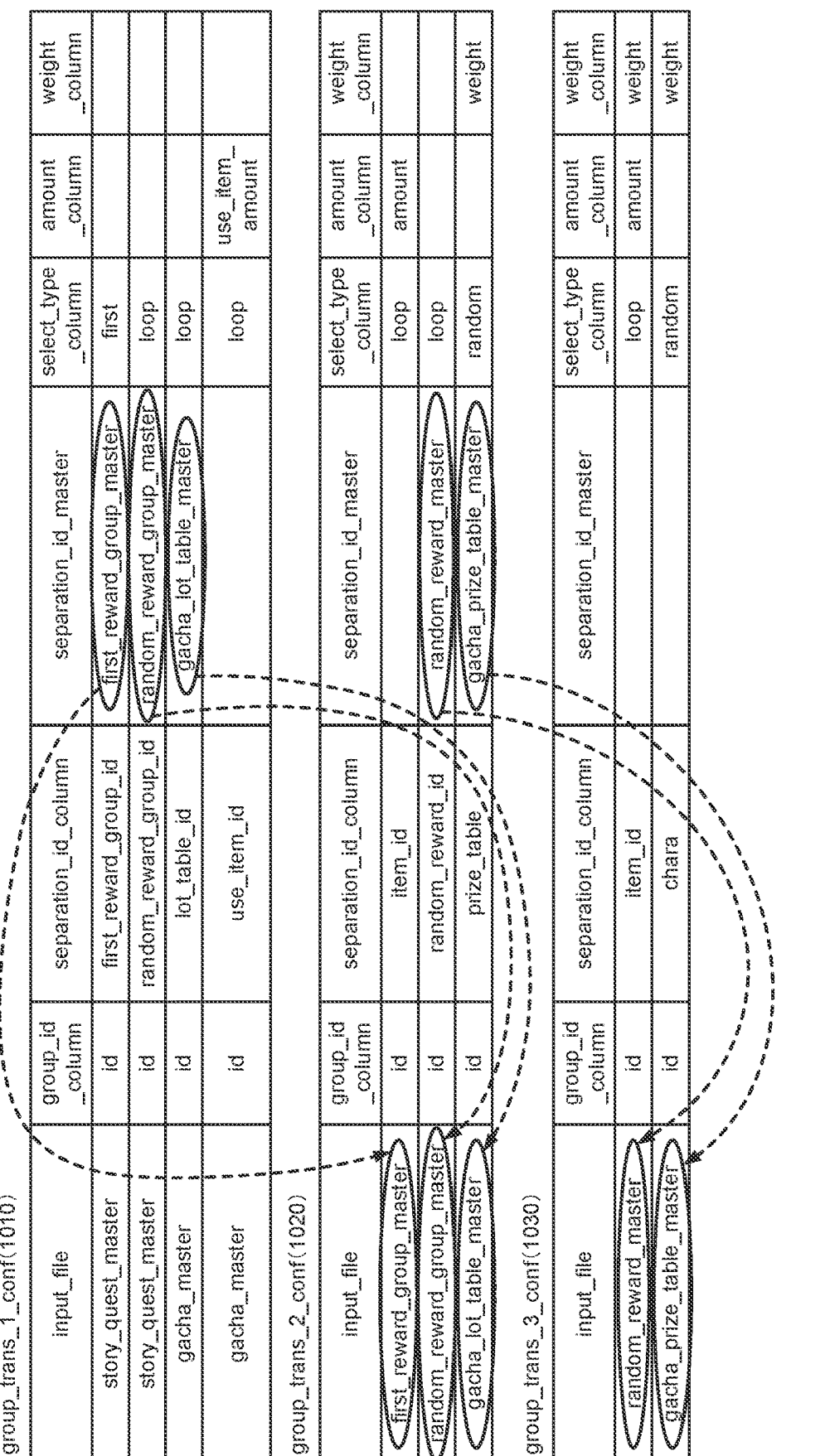
FIG. 10 is a diagram illustrating a standard master according to a method to which the present disclosure is applied.

With reference to FIGS. 8 to 16, processes related to S701 and S702 in FIG. 7 are described in more detail below. FIGS. 8 and 9 illustrate a non-standard master made by a game production office and the like in creation of a game, and FIG. 10 illustrates a standard master to which the present disclosure is applied.

FIG. 8 is a diagram illustrating a known non-standard master with a nesting structure. FIG. 8 illustrates four masters, and their relationships are described below.

The uppermost table in FIG. 8 illustrates a master (parent master), named story_quest_master (801), of a certain game. First, such a non-uniform (i.e., non-standard) master structure contains information such as what can be obtained and at what rate it can be obtained by that action when a quest and/or a gacha is drawn.

Some formats directly designate the items that can be received in the table of one master, while in some cases the id of the group list of the items that can be received are indirectly designated in the form of a reward group and the like. Further, in some other cases, a nesting structure is provided in a form in which when another master describing the details of the targeted id described in one master is referred to, another group list further is designated.

For example, in the example illustrated in FIG. 8, there is the table of the original master (that is parent master) story_quest_master (801), and the ids of respective stories are described as "10001", "10002", and "10003" in the id column on the leftmost side. The first_reward_group_id, which is the id of the item that can be obtained only for the first time, and the random_reward_group_id, which is the id of the item that can be obtained each time, are listed for the ids of respective stories. They are sequentially listed in the column on the right side of the id column of the story such as 10001.

For example, in FIG. 8, when the id of the story is 10001, the group list of the item designated by first_reward_group_id is 1001, and the group list of the item designated by random_reward_group_id is 201.

On the other hand, in the case of the group of the reward for only the first time, another master (child master) is listed as first_reward_group_master (802) in which one with group id of "1001" can obtain "10" (amount) items with item_id of "11" (the procedure of 810). In this manner, in some cases, the specific number of items that can be obtained in the final targeted quest cannot be determined without going through two or more masters (in this case, the parent and child masters). For example, in the case of item 11, the amount of items to be acquired can be determined by referring to the child master as first_reward_group_master (802) from the parent master as story_quest_master (801).

Next, in the case where the id is "10001" in story_quest_master (801), the id (random_reward_group_id) of the item that can be obtained each time is "201". For the item of this id "201", the random_reward_id is determined to be "2001" (the procedure of 820) with reference to still another master (child master) random_reward_group_master (803). Next, with reference to another master (grandchild master) random_reward_master (804), it is determined that for the random_reward_id "2001", the item id (item_id) is "21", the weight is 10000, and the amount is "5" (the procedure of 825). For random_reward_group_id, what item can be obtained and at what rate the item can be obtained cannot be determined without going through two different masters (the child master and grandchild master), namely, random_reward_group_master (803) and random_reward_master (804) (the procedure of 820 and 825). That is, in this case, the master has a three-level structure (i.e., three masters: 801, 803 and 804).

FIG. 9 is a diagram illustrating a known non-standard master with a nesting structure. FIG. 9 illustrates three masters, and their relationships are described below.

FIG. 9 is a diagram illustrating an example of a master structure of a gacha. FIG. 9 illustrates a master structure of a gacha, while FIG. 8 illustrates a master structure of a quest. Objects such as a gacha for which what can be received is unknown at a certain probability also normally have a master of a nesting structure with multiple levels as in FIG. 8. With reference to FIG. 9, first, ids of the gacha "50001" and "50002" are listed in a master as gacha_master (901). Regarding the items that can be received for each id of the gacha, groups for reference, such as "501" and "502", are designated in the lot_table_id column. That is, what can be received and its probability cannot be determined by referring to parent mastergacha_master (901) alone (i.e., there is no column indicating the weight in mastergacha_master (901) as the parent master).

Next, with reference to the master gacha_lot_table_master (902), there are three rarity levels, namely, SR (Super Rare), SSR (Super Super Rare), UR (Ultra Rare) in the gacha group with the id "501" (the procedure of 910). In case of gacha, it has a form in which something can be obtained with a certain weight, and as such, in the case where the gacha id is 50001, for example, the weights that can be taken by the group SR, the group SSR, and the group UR are listed as 80, 15 and 5, respectively in gacha_lot_table_master (902).

Here, the weight is a dimensionless quantity, and represents the relative ratio of occurrence of each event. Accordingly, the probability of occurrence of each event has a value obtained by dividing the weight of the targeted event by the sum of the weights of the events of the same group. For example, in this case, regarding gacha id501, the probability of occurrence of SR is a value obtained by dividing the weight of SR itself by the sum of the weights of all of three SR, SSR and UR, i.e., 100 (=80+15+5), and therefore the probability of occurrence of SR is 80+100=80%. Likewise, the probability of occurrence of SSR is 15%, and the probability of occurrence of UR is 5%. It should be noted that the occurrence probability may be directly described in the master without using weight.

Next, for the rarity, gacha_prize_table_master (903), which is the master describing what can be obtained in each of the groups of SR, SSR and UR, is referred to. With reference to gacha_prize_table_master (903), the characters of three types (chara), namely, "SR_A", "SR_B" and "SR_C", are described in the SR group, and their values of the weights are each "10" (the procedure of 920). That is, the weights of the characters of three types "SR_A", "SR_B" and "SR_C" are 10:10:10 (i.e., 1:1:1), and each character can be received with a probability of 33.3% (=10÷(10+10+10)).

In this manner, regarding the master of the quest, there are cases where the group of the reward is designated as with the above-described first_reward_group_id (802) in FIG. 8, and cases of nesting structures with multiple levels where, as with the SR of the gacha illustrated in FIG. 9, the master of the group (i.e., gacha_lot_table_master (902)) is designated, and, from the designated group, the group names such as SR, SSR and UR, not individual item names, provided with weights regarding their emergence rates are designated to make further specific designation.

While each master of each game normally has a nesting structure with single or multiple levels as described above, the inventor thought it would be possible to achieve conversion to a uniform standard master by individually designating the collection of the middle phase group and the final separated group.

FIG. 10 is a diagram illustrating a standard master according to a method to which the present disclosure is applied. In the method of the present disclosure, the original master is defined as group_trans_1_conf (1010). In group_trans_1_conf (1010) columns of a large collection and a small collection are designated. In a table according to a method to which the present disclosure is applied, a master (input_file) serving as the input source is designated on the leftmost side. In group_trans_1_conf (1010) of this example, four input masters are story_quest_master, story_quest_master, gacha_master, and gacha_master in this order from the top. Here, story_quest_master and gacha_master are listed twice, but are different in child master referred to in each row.

The two masters, story_quest_master and gacha_master, correspond to story_quest_master (801) illustrated in FIG. 8 and gacha_master (901) illustrated in FIG. 9, respectively.

In the method of the present disclosure, the group id column (group_id_column) of three input masters of FIG. 10 is the quest name, and the column on the right side of it is separation_id_column that designates what can be obtained in that quest. In a case of a story quest, the id of the original quest may be designated by group_id_column, and the obtainable reward may be designated by separation_id_column.

In the method of the present disclosure, the largest master is defined as group_trans_1_conf (1010). In group_trans_1_conf (1010), the columns of the large collection and the small collection are designated. Further, in select_type_column therein, the case where the reward can be obtained only for the first time is designated as "first", and the reward that can be obtained each time is designated as "loop". While select_type_column designates two types, "first (only for the first time)" and "loop (each time)" in this example, the types may be three or more types.

While first_reward_group_id and random_reward_group_id are designated as the separated group separation_id_column in FIG. 10, these group ids themselves cannot be the minimum unit of item_id, and therefore the master further specifically defining first_reward_group_id and random_reward_group_id is designated in the separation_id_master column, and then the master designated by separation_id_master is referred to.

Next, with reference to random_reward_group_master and gacha_lot_table_master in group_trans_2_conf (1020), what is listed as group id and which id to be finally viewed are determined. In the case of first_reward_group_master, the final item_id is described in separation_id_column in group_trans_2_conf (1020), and therefore the final value is the value in group_trans_2_conf (1020) as the separation destination (reference destination), and the acquired number is designated by amount_column. For example, the blank amount_column may be defined as "1".

Next, with reference to random_reward_master and gacha_prize_table_master in group_trans_3_conf (1030), what is listed as group id and which id to be finally viewed are determined. In the case of random_reward_master, the final item_id is described in separation_id_column in group_trans_3_conf (1030), and therefore the value in group_trans_3_conf (1030) is the final value as the separation destination, and the acquired number is designated by amount_column, and, the weight is designated by weight_column. For example, the blank amount_column may be defined as "1".

By repeating such operations, a standard master that can be used for any titles of any game producers can be created. As described above with reference to FIG. 10, a structure is obtained in which coupling of the masters with the same structure can be achieved with group_trans_1_conf (1010) as the master for separation from the largest group to a smaller group, group_trans_2_conf (1020) for further specific separation, and group_trans_3_conf (1030) for still further specific separation. When mapping is performed in this state, details of the group_id and separation_id are displayed as the output in accordance with the above-described logic, and the reference destinations are further divided depending on whether they are the first time reward or the reward that can be received each time.

FIG. 11 is a table illustrating the number and weight of each item in an organized manner with FIG. 10 illustrating the standard master of the present disclosure. Each table of FIG. 11 illustrates, from the left column, row number, group_id, separation_id, select_type, amount, and weight.

The three masters illustrated in FIG. 11, namely, group_trans_1 (1110), group_trans_2 (1120), and group_trans_3 (1130) are illustrated in a format in which when the action listed in the group_id column is executed, one listed in the separation_id column can be received by the amount listed in the amount column. Next, one set as separation_id becomes the group_id of the next group_trans_x (here x is an integer of 1 or more). For example, one whose group_id is designated as "10001" of group_trans_1 (1110) and whose separation_id is "1001" is set to "1001" as the group_id of next group_trans_2 (1120) (the procedure of 1111), and is then further separated to the item_id (separation_id) of "11", and thus, relationships of grouped one and separated one are increasingly established. In this manner, all masters are standardized, and can be shifted to a standard master of the template to which the present disclosure is applied.

On the basis of this configuration, calculation is made to determine the number of final items to be obtained as the expected value when the action "10001" is executed one time.

The procedure from group_trans_1 (1110) to group_trans_3 (1130) is as follows.

group_id (group_trans_1 (hereinafter only the last number is presented))→ separation_id (1): rate (1), amount (1)

group_id (2)→ separation_id (2): rate (2), amount (2)

group_id (3)→ separation_id (3): rate (3), amount (3)

Here, in some situation, when acquiring group_id (x) in group_trans_x, a plurality of ids, such as separation_id (x, m (1)), separation_id (x, m (2)), . . . separation_id (x, m (n)), may be received for one group_id (x), and then, the rate (x, m (k)) is defined as the probability that separation_id (x, m (k)) is received when group_id (x) is acquired.

At this time, each k:1≤k≤n, W (separation_id (x, m (k))) is set as a weight of separation_id (x, m (k)).

Equation 1 is as follows.

$$\text{rate}\,(x,\,m(k)) = \frac{W(\text{separation\_id}(x,\,m(k)))}{\sum_{i=1}^{m} W(\text{separation\_id}(x,\,m(i)))} \qquad [1]$$

Next, it is assumed as follows.

A: action

I: item

Depth (A, I): variable x (in the drawing below, x=3) with which separation_id (x, m (k))=item I is set in Equation 1 when action A is executed E (A, I): an expected value of the number of items I to be received when action A is executed s (i, k): separation_id used for the calculation in group_trans_i upon calculation of an expected value of the number of items I to be received when action A is executed $$E(A,\,I) = \prod_{i=1}^{Depth(A,I)} (\text{rate}(i,\,s(i,\,k)) \times \text{amount}(i,\,s(i,\,k))) \qquad [2]$$

Some specific examples are described below with reference to FIG. 11.

Case of Quest Reward

It is assumed that item group 1001 and item group 201 are received when quest 10001 is played one time. The breakdown of each item is:

item group 1001=item 11×10 (see row 1 of group_trans_2) as the items (select_type first) that can be obtained for the first time;

item group 201=item 21×5+item 22×5 (see row 3 and row 4 of group_trans_2, and row 1 and row 2 of group_trans_3) as the items (select_type loop) that can be obtained each time.

Therefore, the sum is:

quest 10001=item 11×10+item 21×5+item 22×5.

Case of Gacha

The expected value of UR_A when gacha 501 is drawn one time in quest 10001 is calculated as follows, with reference to row 7 of group_trans_1.

The UR is 5% at gacha 501 (see row 11 of group_ trans_2), and the UR contains UR_A and UR_B (see rows 11 and 12 of group_trans_3), and therefore the following holds.

$$\text{Expected value}=1\times0.05\times0.5=0.025$$

Accordingly, the expected value of the UR_A when gacha 501 is drawn one time is 0.025.

FIG. 12 is a diagram illustrating an expected value of each item calculated from FIG. 11 illustrating an output to which the present disclosure is applied. The flag in the column "first time" on the rightmost side in FIG. 12 is "TRUE" when the action concerned is the first time, and is "FALSE" for the second and subsequent times. Specifically, the row that is TRUE in the "first time" column represents an item that is given only when the action is the first time, and the row that is FALSE in the "first time" column represents an item that is given when the action is the second and subsequent times.

In addition, rows 1 to 9 of FIG. 12 list the items that can be received in the quest, and rows 10 to 17 and rows 19 to 26 list the items that can be received for the gacha. Specifically, in rows 1 to 9, quest numbers are listed in the action name column, whereas in rows 10 to 17 and rows 19 to 26, gacha numbers are listed in the action name column.

For example, with reference to row 1 in FIG. 12, when action 10001 is executed, items 11 can be received by an amount of 10.0 only for the first time (i.e., when the first time column is TRUE). On the other hand, with reference to row 2, even when the same action 10001 as row 1 is executed, items 21 can be received by an amount of 5.0 for the execution of the action of the second and subsequent times (i.e., when the first time column is FALSE).

On the other hand, with reference to row 10 in FIG. 12, when action 50001, which is gacha, is executed, item SR_A can be received with a probability of 0.266 for the second and subsequent times. In this example, the first time column of gacha listed in rows 10 to 27 is all "FALSE (the second and subsequent times)".

FIGS. 13 to 16 illustrate examples where the original master of FIG. 13 does not have a nesting structure, while FIGS. 8 to 12 illustrate examples where the original master of FIGS. 8 and 9 has a nesting structure.

FIG. 13 is a diagram illustrating non-standard masters. The masters illustrated in FIG. 13 are non-standard masters, namely, masterbattle_master (1310) related to battle and masterevent_gacha_master (1320) related to gacha, each of which is a single master alone with no nesting structure (i.e., hierarchical structure) and thus no child master to be referred to.

In association with the ids of battle_master (1310) of FIG. 13 (i.e., 3001, 3002, 3003, 3004 and 3005), the id and amount of the final items that can be received for the first time and the id and amount of the final items that can be received for the second and subsequent times are listed in a single master.

For example, with reference to battle_master (1310) for the battle, the ids of the items that can be received for the first time are listed as 111, 111, 111, 111 and 111 in this order from the top in the first_tresure_id column, and the receivable amounts of the ids are listed as 5, 10, 15, 20 and 25 in this order from the top in the example of first_tresure_a-mount. On the other hand, the ids of the items that can be received each time are listed as 222, 222, 222, 222 and 222 in this order from the top in the random_tresure_id column, and the receivable amounts of the ids are listed as 50, 100, 150, 200 and 250 in this order from the top in the example of random_tresure_amount.

For example, in the case of the battle with the item id 3001, the item id that can be received for the first time is 111 and the number of them is 5, whereas the item id that can be received each time is 222 and the number of them is 50.

In addition, in event_gacha_master (1320) for gacha, which is another master in FIG. 13, the weight of each card is listed in association with 100001 as the id. For example, in the case where the gacha id is 100001 and the card is UR_AA, the weight is 1, whereas in the case where the gacha id is 100001 and the card is SSR_AA, the weight is 4. The relationship between the weight and the probability is as described above.

FIG. 14 is a diagram illustrating the non-standard master of FIG. 13 converted to a standard master to which the present disclosure is applied. The masters of FIG. 13, namely, battle_master (1310) and event_gacha_master (1320), have a simple non-hierarchical structure in which the final information about the number or weight of each item to be received is provided in the master itself. Therefore, even when the masters of FIG. 13, battle_master (1310) and event_gacha_master (1320), are converted to a standard master, the table required for the mapping is only one group_trans_1_conf 1.

The basic structure of FIG. 14 is the same as 1010 of FIG. 10, and is therefore omitted.

When the master of FIG. 13 is converted to the standard master to which the present disclosure is applied, it can be organized into an output as that illustrated in FIG. 15 as with the master illustrated in FIG. 8, and an expected value list as that illustrated in FIG. 16 can be calculated.

FIG. 15 is a diagram illustrating an output of the standard master illustrated in FIG. 14 to which the present disclosure is applied. In this drawing, rows 1 to 10 list the quest, and rows 11 to 26 list the gacha. For example, in the case of quest, with reference to row 1 of group_trans1, when group_id is 3001 and separation_id is 111, select_type is first (first time), and amount is 5. Likewise, in the case of gacha, with reference to row 11, when group_id is 100001 and separation_id is UR_AA, select_type is random, amount is 1, and weight is 1.

The reason that select_type is first (first time) in row 1 is not because separation_id is 111, but because, as a simple setting, it is set in the original master such that the items that can be received when the quest of group_id 3001 is played is set, and the set value of a receivable amount of 5 for separation_id 111 is the first time reward that can be received only for the first time. Here, select_type is described as first so that it is clear that it is the first time reward. For example, it may have a set value in which when the quest of group_id 3001 is played, five items with separation_id 111 can be received for the first time (first), and one item can be further received each time (loop) as the loop reward separately from the first time.

FIG. 16 is a diagram illustrating a list of expected values of the standard master illustrated in FIG. 14 to which the present disclosure is applied. In this drawing, rows 1 to 10 list the quest, and rows 11 to 26 list the gacha. For example, with reference to row 1 of FIG. 16, when the action name is 3001, one with item name 111 can be received by an amount of 5.0 only for the first time (TRUE). In addition, with reference to row 11, when the action name is 100001, the item name UR_AA can be received with an expected value of 0.01.

FIG. 17 is a diagram illustrating play assumption. In this table, the assumed number of times of the action (i.e., play assumption) of each day is created for each action. More specifically, two play assumption tables, namely, a table of story_quest_master (1710) related to quest and a table of gacha_master (1720) related to gacha, are illustrated. In the id column of story_quest_master (1710) on the upper side in FIG. 17, the ids of quest are listed as 10001, 10002 and 10003 from the top. In the three columns on the right side of the id column, the number of quests performed by the player for each day (day 1 (first day), day 2 (second day) and day 3 (third day)) is listed. For example, it is assumed that a player plays the quest with quest id 10001 five times in day 1, three times in day 2, and 0 time in day 3. In this case, the blank in action_num (the number of actions) represents 0 time.

In addition, in the id column in gacha_master (1720) on the lower side in FIG. 17, the ids of the gacha are listed as 50001 and 50002 from the top. The number of gachas performed by a player for each day (day 1 (first day), day 2 (second day) and day 3 (third day)) is listed in the three columns on the right side of gacha id. For example, it is assumed that a player plays gacha with gacha id 50001 two times in day 1, three times in day 2, and 0 time in day 3. In this case, the blank in action_num (the number of actions) represents 0 time.

FIG. 18 is a diagram illustrating the number of acquired items of each day in each action. The above-described expected value illustrated in FIG. 12 is multiplied by the number of times of actions of each day of the play assumption illustrated in FIG. 17 to calculate the amount of items that can be obtained for each day for each combination of actions and items.

In FIG. 18, rows 1 to 9 represent the action of the quest, and rows 10 to 27 represent the action of the gacha.

For example, with reference to row 1, the action name is "10001" and the item name is "11" in this case. With reference to FIG. 17, the number of times of actions is five times in day 1 (first day), three times in day 2 (second day), and 0 time in day 3 (third day), and therefore the acquired number of each day is obtained by multiplying the amount of corresponding row of FIG. 12 by the number of times of actions of each day. For example, in the case of row 1, the acquired number of day 1 is 10×5=50, the acquired number of day 2 is 10×3=30, and the acquired number of day 3 is 10×0=0.

Next, for example, with reference to row 10, the action name is "50001" and the item name is "SR_A" in this case. The number of times of actions is two times in day 1 (first day), three times in day 2 (second day), and 0 time in day 3 (third day), and therefore the acquired amount of each day is obtained by multiplying the amount of corresponding row of FIG. 12 by the number of times of each day. For example, in the case of row 10, the acquired amount of day 1 is 0.266×2=0.532, the acquired number of day 2 is 0.266×3=0.798, and the acquired number of day 3 is 0.266×0=0.

In FIG. 18, the same item is listed in combination of a plurality of actions. For example, the item name "11" is listed in combination with different actions 10001, 10002, 10003 and 50001 in row 1, row 4, row 7 and row 18, respectively.

FIG. 19 is a diagram illustrating the total number of each item acquired each day according to play assumption. By adding up the same item that can be obtained through each action, it is possible to predict the number of each item to be acquired over multiple days of play. In FIG. 19, each example of day 1 (first day), day 2 (second day), and day 3 (third day) is a total number that is calculated from the calculation result of the above-described assumed number of times of play x expected value of each day by organizing it for each item. The example of total on the rightmost side represents the sum of each item of three days, day 1 to day 3.

For example, the item with item name 11 can be acquired by a total of 10 in day 1 (first day), a total of 20 in day 2 (second day), and a total of 130 in day 3 (third day). Thus, it is possible to acquire a total of 160 items 11 in the three days by playing this game.

In addition, for example, the item with item name SR_A can be acquired by a total amount of 0.532 in day 1 (first day), a total amount of 0.798 in day 2 (second day), and a total amount of 0.532 in day 3 (third day). Thus, it is possible to acquire the item SR_A by an amount of 1.862 in three days by playing this game.

In FIG. 19, item names 11, 21 and 22 represent items that can be obtained in quest, and SR_A to UR_E represent items that can be obtained in gacha.

FIG. 20 is a table for describing the consumed amount of the item. FIG. 20 describes the consumed amount of each item, while FIG. 19 describes the acquired amount of each item. The consumption of items is similar to the acquisition of items, and in the expected value list in FIG. 12, the minus column in the quantity column represents the number of consumed items, and therefore, the type and quantity of consumed items can be determined by multiplying the number of items consumed by the number of times the item has been played. In FIG. 12 illustrating the expected value, two items, item 11 in row 18 and item 21 in row 27, have a minus amount. In other words, items other than item 11 and item 21 are not consumed in the example illustrated in FIG. 12.

With reference to the row of item 11 in FIG. 20, the consumption amount is 40 in day 1, the consumption amount is 60 in day 2, and the consumption amount is 0 in day 3. Accordingly, the sum of items 11 consumed in the three days is 100.

For example, in the example illustrated in FIG. 20, the consumed amounts of item 11 and item 21 in three days are 100 and 40, respectively while other items are not consumed (i.e., the total consumption amount is zero).

FIG. 21 is a table illustrating a balance of each item. The balance (=acquired amount−consumed amount) of each item can be calculated from the acquired amount of each item calculated from FIG. 19 in accordance with play assumption, and the consumed amount of each item calculated from FIG. 20 in accordance with play assumption. By determining the difference between the acquired amount and consumed amount of each item in the above-described manner, the balance of the item in playing the game can be determined.

For example, regarding item 11, the balance of day 1 is −30, the balance of day 2 is −40, and the balance of day 3 is 130. Accordingly, the balance of the three days is 60.

For example, regarding item SR_A, the balance of day 1 is 0.532, the balance of day 2 is 0.798, and the balance of day 3 is 0.532. Accordingly, the balance of the three days is 1.862.

The balance of each item of FIG. 21 can be calculated by the method described with reference to FIGS. 14 to 20 by using the expected value illustrated in FIG. 12. With this method, by calculating the acquired amount and consumed amount of each item in the quest and gacha, and calculating the balance by subtracting the consumed amount from the acquired amount, the balance of magic stones as described in the FIG. 6 and the like can be calculated.

In this manner, by comparing the balance of each item before and after the parameter adjustment and adjusting the balance of all items or each item after the parameter adjustment and the like, more favorable parameters, i.e., more profitable game parameters, can be detected.

Figure 22:
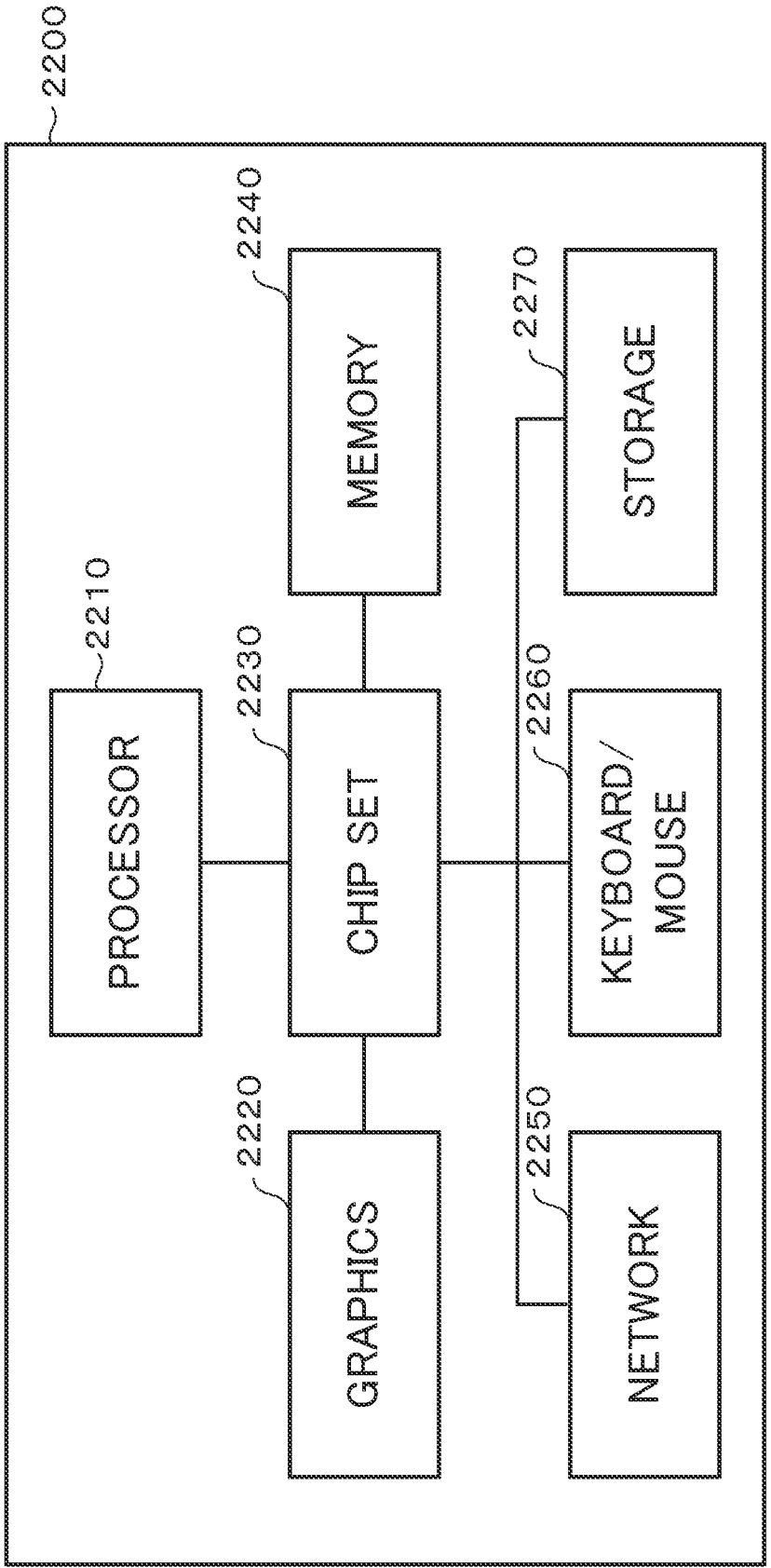
FIG. 22 is a block diagram illustrating a computer that executes a program for performing an operation according to the present disclosure.

FIG. 22 is a block diagram illustrating a computer that executes a program for performing an operation according to the present disclosure. For example, computer 2200 that executes the program according to the present disclosure may include processor 2210, graphics 2220, chip set 2230, memory 2240, network control 2250, keyboard/mouse 2260, and storage 2270, and these components are normally connected to each other through bidirectional buses.

Processor 2210 executes the program stored in the memory in conjunction with chip set 2230. Under the control of processor 2210, chip set 2230 controls the functions of graphics 2220, memory 2240, network control 2250, keyboard/mouse 2260, and storage 2270.

The graphics controls an internal or external display device of computer 2200.

Network control 2250 is connected with an external network, and controls wired or wireless LAN and the like. Keyboard/mouse 2260 is an input means for controlling computer 2200, and may be integrated with computer 2200 or may be externally provided. Storage 2270 includes a hard disk and/or an optical disk, and is controlled by processor 2210 through chip set 2230 to store data and/or order.

For example, the program including a command for executing steps S701, S702, S703, and S704 described with reference to FIG. 7 may be executed with computer 2200 described with reference to FIG. 22.

The method according to the present disclosure may be executed by utilizing AI including deep learning or machine learning.

While the present disclosure is described assuming the use of game for convenience of description, the present disclosure is not limited to games, and may be applied to general simulation of web services and the like, for example. For example, services that allow users to write articles include elements that can be used in login bonus-like games as users write articles. Also, in the same way, in manga-based applications that allow users to read manga using points or other means, items can be received or used depending on the number of days logged in or actions taken. The present disclosure is a concept that can be applied to such web services or applications that incorporate a game mechanism. Even in the field of such services or applications and games, players are also called users.

Overview of Present Disclosure

An evaluation method for a game according to example 1 of the present disclosure includes: by a computer, (A) calculating multiplication of an expected value of acquisition and consumption of an item when a player performs an action, and an assumed number of times of the action performed by the player on a basis of a parameter of a master; and (B) visualizing a balance of the item on a basis of a result of the multiplication.

An evaluation method for a game according to example 2 of the present disclosure is the evaluation method for the game according to example 1 further including: by the computer, (C) changing the parameter in accordance with an instruction for changing the parameter; and (D) re-calculating the multiplication of the expected value and the assumed number of times on a basis of the parameter that is changed, and visualizing a balance of the item on a basis of a result of the re-calculating of the multiplication.

An evaluation method for a game according to example 3 of the present disclosure is the evaluation method for the game according to example 2, in which the computer repeats the (C) and the (D) until the balance becomes a predetermined value or smaller.

An evaluation method for a game according to example 4 of the present disclosure is the evaluation method for the game according to example 1, in which the master is a master that is converted from a non-standard master and has a format uniformized among a plurality of games, the non-standard master being a master having a format that is not uniformized among the plurality of games.

An evaluation method for a game according to example 5 of the present disclosure is the evaluation method for the game according to example 1, in which in the (B), a change in the balance of the item over time is visualized.

An evaluation method for a game according to example 6 of the present disclosure is the evaluation method for the game according to example 5, in which in the (B), a change in an acquired amount and a consumed amount of the item over time is further visualized.

A game evaluation apparatus according to example 7 of the present disclosure includes a memory storing a processor and a command, in which the game evaluation apparatus (A) calculates multiplication of an expected value of acquisition and consumption of an item when a player performs an action, and an assumed number of times of the action performed by the player on a basis of a parameter of a master; and (B) visualizes a balance of the item on a basis of a result of the multiplication.

A game evaluation program according to example 8 of the present disclosure is configured to cause a processor to execute a command for (A) calculating multiplication of an expected value of acquisition and consumption of an item when a player performs an action, and an assumed number of times of the action performed by the player on a basis of a parameter of a master; and (B) visualizing a balance of the item on a basis of a result of the multiplication.

An evaluation method for an application software according to example 9 of the present disclosure includes: by a computer, (A) calculating multiplication of an expected value of acquisition and consumption of an item when a user performs an action, and an assumed number of times of the action performed by the user on a basis of a parameter of a master; and (B) visualizing a balance of the item on a basis of a result of the multiplication.

This application is entitled to and claims the benefit of Japanese Patent Application No. 2020-116529 filed on Jul. 6, 2020, the disclosure each of which including the specification, drawings and abstract is incorporated herein by reference in its entirety.

INDUSTRIAL APPLICABILITY

The present disclosure is applicable to a method, an apparatus or a program for evaluating a game, for example.

REFERENCE SIGNS LIST

101 UX policy determination
102 Game logic design
103 Parameter setting

104 UX visualization
105 KPI design
106 UX confirmation
201 Expansion period
202 Sharp decline period
203 Gradual decline period
204 Core enjoyment
205 Sense of growth
206 Sense of heroism
210 Maximization of sales through level-design
211 Sales maintenance through level-design
2200 Computer
2210 Processor
2220 Graphics
2230 Chip set
2240 Memory
2250 Network control
2260 Keyboard/mouse
2270 Storage

The invention claimed is:

1. A computer-implemented evaluation method for a game, comprising:

by a computer processor executing program instructions utilizing artificial intelligence including deep learning or machine learning, (A) computationally converting using automated algorithmic processing a hierarchically-nested non-standard master with parent masters, child masters, and grandchild masters having a format that is not uniformized among a plurality of games into a standard master format having a format uniformized among the plurality of games, wherein the converting requires computational traversal through multiple database levels where what item can be obtained and at what rate cannot be determined without algorithmically processing through at least two different masters including child masters and grandchild masters;

(B) executing simultaneous computational processing of multiplication calculations across multiple data streams including expected values of acquisition and consumption of items when a player performs actions, and assumed numbers of times of the actions performed by the player on a basis of parameters of the standard master format, wherein the processing coordinates calculations across interconnected masters where the same item can be acquired from multiple different contents with different master structures, and wherein comprehensive and detailed simulation was virtually impossible in the related art;

(C) generating and rendering using graphics processing hardware real-time visual representations on a display device showing coordinated balance data of the items on a basis of results of the multiplication including coordinated display of changes in acquired amounts, consumed amounts, and balance of items over multiple playing days; and (D) executing automated iterative processing loops that continuously readjust parameters of the standard master format based on the visualized balance, wherein the iterative loops automatically repeat the calculating and visualizing steps when required as a result of parameter readjustment until predetermined balance values are achieved without manual intervention, wherein the standard master format is a master data structure that is converted from a hierarchically-nested non-standard master with multi-level nesting structure including parent masters, child masters, and grandchild masters and has a format uniformized among the plurality of games, the hierarchically-nested non-standard master being a master data structure having a multi-level nesting structure and format that is not uniformized among the plurality of games.

2. The computer-implemented evaluation method for the game according to claim 1, further comprising:

by the computer processor, (E) changing the parameter in accordance with an instruction for changing the parameter; and (F) re-calculating the multiplication of the expected value and the assumed number of times on a basis of the parameter that is changed, and visualizing, on the display device, an updated balance of the item on a basis of a result of the re-calculating of the multiplication.

3. The computer-implemented evaluation method for the game according to claim 2, wherein the computer processor repeats the (E) and the (F) until the balance becomes a predetermined value or smaller, thereby preventing imbalanced item acquisition and consumption that would reduce player engagement.

4. The computer-implemented evaluation method for the game according to claim 1, wherein in the (C), the coordinated display shows changes in the balance of items over a predetermined number of playing days.

5. The computer-implemented evaluation method for the game according to claim 4, wherein in the (C), the coordinated display further shows changes in acquired amounts and consumed amounts of items over the predetermined number of playing days.

6. A game evaluation system comprising:

a memory storing instructions; and a processor configured to execute the instructions to:

(A) computationally convert using automated algorithmic processing a hierarchically-nested non-standard master with parent masters, child masters, and grandchild masters having a format that is not uniformized among a plurality of games into a standard master format having a format uniformized among the plurality of games, wherein the converting requires computational traversal through multiple database levels where what item can be obtained and at what rate cannot be determined without algorithmically processing through at least two different masters including child masters and grandchild masters;

(B) execute simultaneous computational processing of multiplication calculations across multiple data streams including expected values of acquisition and consumption of items when a player performs actions, and assumed numbers of times of the actions performed by the player on a basis of parameters of the standard master format, wherein the processing coordinates calculations across interconnected masters where the same item can be acquired from multiple different contents with different master structures;

(C) generate and render using graphics processing hardware real-time visual representations on a display device showing coordinated balance data of items on a basis of results of the multiplication including coordinated display of changes in acquired amounts, consumed amounts, and balance of items over multiple playing days; and (D) execute automated iterative processing loops that continuously readjust parameters of the standard master format based on the visualized balance, wherein the iterative loops automatically repeat the calculating and visualizing steps when required as a result of parameter readjustment until predetermined balance values are achieved without manual intervention, wherein the standard master format is a master data structure that is converted from a hierarchically-nested non-standard master with multi-level nesting structure including parent masters, child masters, and grandchild masters and has a format uniformized among the plurality of games, the hierarchically-nested non-standard master being a master data structure having a multi-level nesting structure and format that is not uniformized among the plurality of games.

7. A non-transitory computer-readable storage medium storing a game evaluation program that, when executed by a processor, causes the processor to perform operations comprising:

(A) computationally converting using automated algorithmic processing a hierarchically-nested non-standard master with parent masters, child masters, and grandchild masters having a format that is not uniformized among a plurality of games into a standard master format having a format uniformized among the plurality of games, wherein the converting requires computational traversal through multiple database levels where what item can be obtained and at what rate cannot be determined without algorithmically processing through at least two different masters including child masters and grandchild masters;

(B) executing simultaneous computational processing of multiplication calculations across multiple data streams including expected values of acquisition and consumption of items when a player performs actions, and assumed numbers of times of the actions performed by the player on a basis of parameters of the standard master format, wherein the processing coordinates calculations across interconnected masters where the same item can be acquired from multiple different contents with different master structures;

(C) generating and rendering using graphics processing hardware real-time visual representations on a display device showing coordinated balance data of items on a basis of results of the multiplication including coordinated display of changes in acquired amounts, consumed amounts, and balance of items over multiple playing days; and (D) executing automated iterative processing loops that continuously readjust parameters of the standard master format based on the visualized balance, wherein the iterative loops automatically repeat the calculating and visualizing steps when required as a result of parameter readjustment until predetermined balance values are achieved without manual intervention, wherein the standard master format is a master data structure that is converted from a hierarchically-nested non-standard master with multi-level nesting structure including parent masters, child masters, and grandchild masters and has a format uniformized among the plurality of games, the hierarchically-nested non-standard master being a master data structure having a multi-level nesting structure and format that is not uniformized among the plurality of games.

8. A computer-implemented evaluation method for an application software, comprising:

by a computer processor executing program instructions utilizing artificial intelligence including deep learning or machine learning, (A) computationally converting using automated algorithmic processing a hierarchically-nested non-standard master with parent masters, child masters, and grandchild masters having a format that is not uniformized among a plurality of applications into a standard master format having a format uniformized among the plurality of applications, wherein the converting requires computational traversal through multiple database levels where what item can be obtained and at what rate cannot be determined without algorithmically processing through at least two different masters including child masters and grandchild masters;

(B) executing simultaneous computational processing of multiplication calculations across multiple data streams including expected values of acquisition and consumption of items when a user performs actions, and assumed numbers of times of the actions performed by the user on a basis of parameters of the standard master format, wherein the processing coordinates calculations across interconnected masters where the same item can be acquired from multiple different contents with different master structures;

(C) generating and rendering using graphics processing hardware real-time visual representations on a display device showing coordinated balance data of items on a basis of results of the multiplication including coordinated display of changes in acquired amounts, consumed amounts, and balance of items over multiple playing days; and (D) executing automated iterative processing loops that continuously readjust parameters of the standard master format based on the visualized balance, wherein the iterative loops automatically repeat the calculating and visualizing steps when required as a result of parameter readjustment until predetermined balance values are achieved without manual intervention, wherein the standard master format is a master data structure that is converted from a hierarchically-nested non-standard master with multi-level nesting structure including parent masters, child masters, and grandchild masters and has a format uniformized among the plurality of applications, the hierarchically-nested non-standard master being a master data structure having a multi-level nesting structure and format that is not uniformized among the plurality of applications.

* * * * *